(12) United States Patent
Aggarwal et al.

(10) Patent No.: US 10,503,394 B2
(45) Date of Patent: Dec. 10, 2019

(54) SYSTEM AND METHOD FOR FACILITATING ACCESS TO ELECTRONIC DATA

(71) Applicant: The Toronto-Dominion Bank, Toronto (CA)

(72) Inventors: Garima Aggarwal, Toronto (CA); Hisham Ibrahim Salama, Toronto (CA); Rakesh Thomas Jethwa, Toronto (CA); Paul Mon-Wah Chan, Markham (CA); John Jong Suk Lee, Toronto (CA); Dean C. N. Tseretopoulos, Toronto (CA); Amber Rose Cossitt, Courtice (CA)

(73) Assignee: The Toronto-Dominion Bank, Toronto (CA)

( * ) Notice: Subject to any disclaimer, the term of this patent is extended or adjusted under 35 U.S.C. 154(b) by 524 days.

(21) Appl. No.: 15/286,479

(22) Filed: Oct. 5, 2016

(65) Prior Publication Data

US 2018/0096319 A1 Apr. 5, 2018

(51) Int. Cl.
*G06F 3/0488* (2013.01)
*G06F 21/31* (2013.01)
(Continued)

(52) U.S. Cl.
CPC .......... *G06F 3/04883* (2013.01); *G06F 21/31* (2013.01); *G06Q 20/108* (2013.01);
(Continued)

(58) Field of Classification Search
None
See application file for complete search history.

(56) References Cited

U.S. PATENT DOCUMENTS 5,884,289 A * 3/1999 Anderson ............ G06Q 20/105
235/380
6,324,524 B1 * 11/2001 Lent ....................... G06Q 20/10
705/14.39
(Continued)

OTHER PUBLICATIONS

Henley, William Edward (1994). Statistical aspects of credit scoring. PhD thesis Open University (Credit Report) (Year: 1994).*
(Continued)

*Primary Examiner* — Chikaodinaka Ojiaku
(74) *Attorney, Agent, or Firm* — Brett J. Slaney; Blake, Cassels & Graydon LLP

(57) ABSTRACT

A method and system are provided for facilitating access to electronic data. The method is executed by a processor of a computing device. The computing device includes the processor coupled to a memory, a communications module, and an input device. The method includes receiving a first input from the input device representing a request from a request initiator to access funds for use in a transaction, requesting and receiving, via the communications module, financial health data associated with the request initiator, and determining a second input for accessing the funds. The second input is received from the input device and has a complexity dependent on the financial health data. The method also includes facilitating access to the funds when the second input is received.

20 Claims, 13 Drawing Sheets

(51) Int. Cl.
  *G06Q 20/10* (2012.01)
  *G06Q 20/32* (2012.01)
  *G06Q 20/40* (2012.01)
(52) U.S. Cl.
  CPC ....... *G06Q 20/3223* (2013.01); *G06Q 20/403* (2013.01); *G06Q 20/405* (2013.01)

(56) References Cited

U.S. PATENT DOCUMENTS

| | | | |
|---|---|---|---|
| 9,308,456 B2 | 4/2016 | Derome et al. | |
| 10,157,400 B1* | 12/2018 | Georgi | G06Q 30/0227 |
| 2002/0007341 A1* | 1/2002 | Lent | G06Q 30/06 |
| | | | 705/38 |
| 2002/0052833 A1* | 5/2002 | Lent | G06Q 20/10 |
| | | | 705/38 |
| 2007/0011099 A1* | 1/2007 | Sheehan | G06Q 20/32 |
| | | | 705/65 |
| 2009/0133499 A1* | 5/2009 | Cato | G01P 5/08 |
| | | | 73/514.16 |
| 2009/0177563 A1* | 7/2009 | Bernstein | G06Q 20/04 |
| | | | 705/30 |
| 2010/0250421 A1* | 9/2010 | Ariff | G06Q 40/00 |
| | | | 705/35 |
| 2010/0250430 A1* | 9/2010 | Ariff | G06Q 40/00 |
| | | | 705/38 |
| 2011/0307382 A1* | 12/2011 | Siegel | G06Q 20/04 |
| | | | 705/44 |
| 2013/0282542 A1* | 10/2013 | White | G06Q 40/00 |
| | | | 705/35 |
| 2013/0297509 A1* | 11/2013 | Sebastian | G06Q 20/3226 |
| | | | 705/44 |
| 2014/0143682 A1* | 5/2014 | Druck | G06Q 10/107 |
| | | | 715/752 |
| 2014/0156501 A1* | 6/2014 | Howe | G06Q 40/025 |
| | | | 705/38 |
| 2015/0221044 A1* | 8/2015 | Ariff | G06Q 40/00 |
| | | | 705/30 |
| 2016/0189143 A1* | 6/2016 | Koeppel | G06K 19/0739 |
| | | | 705/41 |
| 2016/0364794 A1* | 12/2016 | Chari | G06Q 40/02 |
| 2017/0126649 A1* | 5/2017 | Votaw | G06F 16/24578 |

OTHER PUBLICATIONS

D. Dukić, G. Dukić and L. Kvesić, "A credit scoring decision support system," Proceedings of the ITI 2011, 33rd International Conference on Information Technology Interfaces, Dubrovnik, 2011, pp. 391-396. (Credit Scoring).* www.moven.com; https://web.archive.org/web/20160115134205/ https://www.moven.com/; available online at least as early as Aug. 2016.

www.getrather.com; https://web.archive.org/web/20161002090100/ http://getrathercom/; available online at least as early as Aug. 2016.

\* cited by examiner

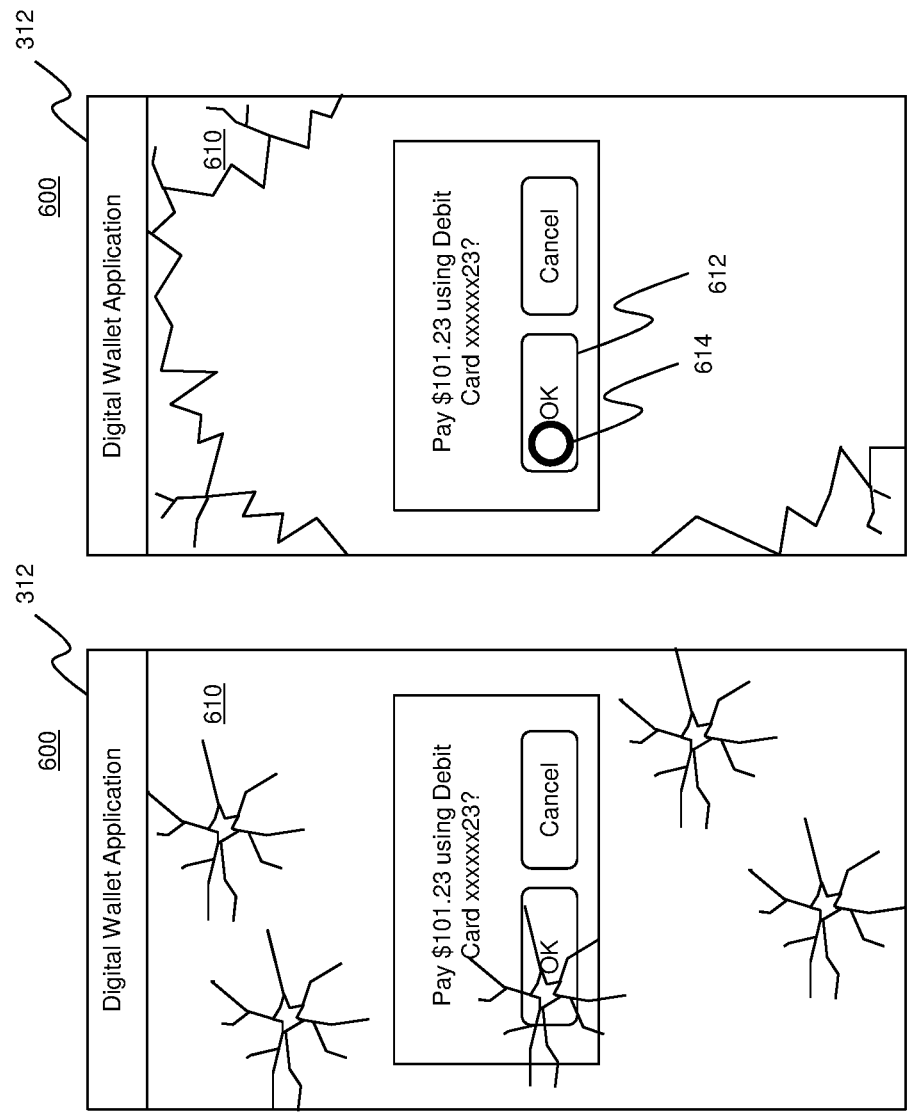

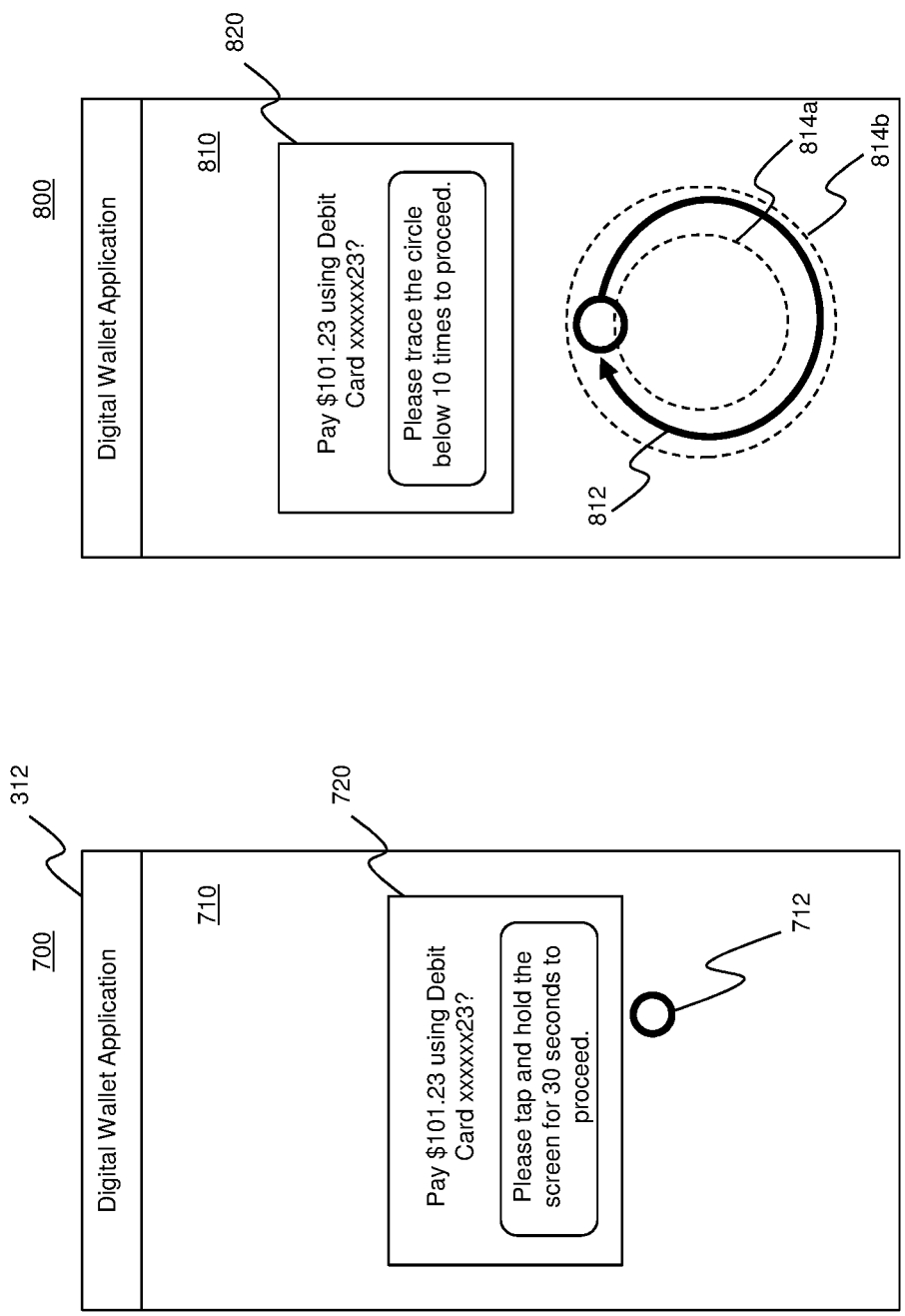

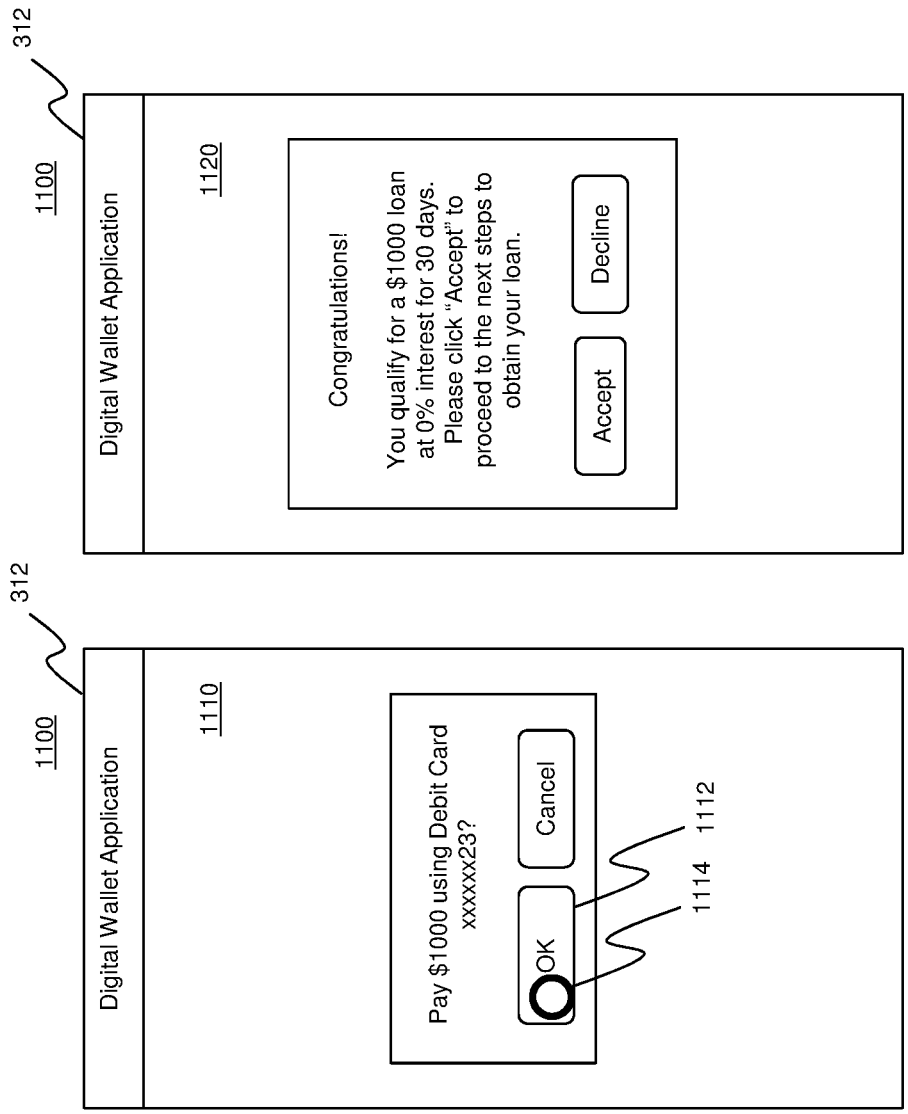

SYSTEM AND METHOD FOR FACILITATING ACCESS TO ELECTRONIC DATA

TECHNICAL FIELD

The following relates generally to facilitating access to electronic data.

BACKGROUND

Electronic payment systems enable a consumer to pay for products and services using electronic data without accessing, handling, or sending physical currency or physical instruments representing funds. For example, payment terminals, also known as point of sale terminals, allow for a consumer to swipe, insert or tap a credit card or debit card to provide a payment to a merchant. In recent years, payments can be made using mobile devices. For example, a payment can be made via the internet by using a mobile device to access mobile applications (e.g., banking applications, merchant applications), merchant websites, digital wallets, etc. A mobile device may also communicate with a point of sale terminal to make a payment using short-range wireless communication technology (e.g., near field communication or radio-frequency identification). However, the availability and convenience of electronic payment systems can increase consumer spending in a way that may conflict with a consumer's ability to budget and/or accumulate savings.

BRIEF DESCRIPTION OF THE DRAWINGS

Embodiments will now be described by way of example only with reference to the appended drawings wherein:

FIGS. 7A-7D are diagrams of an example graphical user interface of a digital wallet application.

FIG. 8 is a diagram of another example graphical user interface of a digital wallet application.

FIG. 9 is a diagram of another example graphical user interface of a digital wallet application.

FIGS. 12A and 12B are diagrams of an example graphical user interface of a digital wallet application.

DETAILED DESCRIPTION

Figure 1:
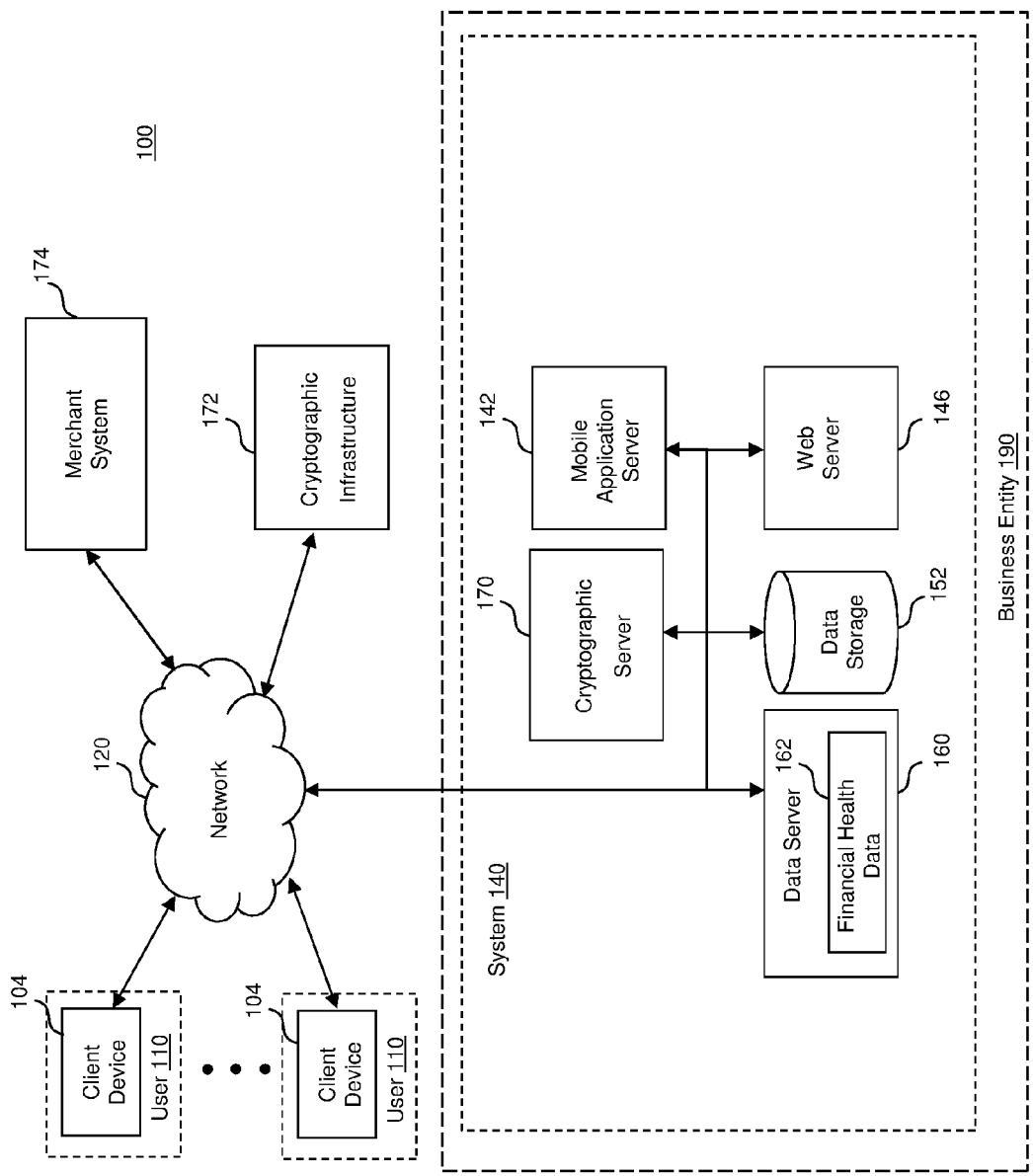
FIG. 1 is a schematic diagram of an example computing environment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practised without these specific details. In other instances, well-known methods, procedures and components have not been described in detail so as not to obscure the example embodiments described herein. Also, the description is not to be considered as limiting the scope of the example embodiments described herein.

Electronic payment systems can facilitate spending of funds by making the payment process shorter and more convenient for a consumer. This can facilitate impulse or otherwise unwise purchases by minimizing the time between initiating a purchase by the consumer and completing the purchase (i.e., by providing payment), during which time the consumer may otherwise reconsider the purchase. Over time, a consumer's initial desire for the product or service may subside or the consumer may determine the cost of such product or service is not justified in view of the perceived value/benefit. Furthermore, if an obstacle is presented to the consumer to make it more difficult to complete the purchase, the consumer may decide that it is not worth the effort to overcome the obstacle. Therefore, a consumer may abort the purchase for any of the reasons above.

Requiring more complex inputs to be provided in order to access funds for payment in a transaction can provide an opportunity for the user or other purchasing entity to reconsider the transaction while performing the input. A purchasing entity may also find performing a complex input to be inconvenient and not worth the effort for certain purchases. This may be more likely if the initial desire for the product or service was on impulse and not to satisfy a preplanned intention to purchase the product or service. When a purchasing entity is deterred or prevented from a purchase or other transaction, obstacles to maintaining a budget or accumulating savings may be avoided or mitigated.

Electronic payments systems can also facilitate spending by making the payment process more convenient by accommodating payment preferences of a consumer. Electronic payment systems typically support multiple forms of payment from numerous sources. Mobile applications, merchant websites and point of sale terminals may accept electronic payments from debit cards, bank accounts, credit cards, gift cards, online payment service providers (e.g., PayPal), etc. However, consumers may select specific sources of funds for payment out of habit, convenience or even arbitrarily. Providing an alternative source of funds for use in a transaction based on financial health, instead of the initial source selected by the consumer or other purchasing entity, may avoid or mitigate some of the obstacles to maintaining a budget or accumulating savings.

In one aspect, there is provided a computing device for facilitating access to electronic data. The computing device includes a processor coupled to a memory, a communications module and an input device. The memory stores computer executable instructions that when executed by the processor cause the processor to receive a first input from the input device representing a request from a request initiator to access funds for use in a transaction, request and receive, via the communications module, financial health data associated with the request initiator, and determine a second input for accessing the funds. The second input is received from the input device and has a complexity dependent on the financial health data. The computer executable instructions also cause the processor to facilitate access to the funds when the second input is received.

In another aspect, there is provided a method of facilitating access to electronic data. The method is executed by a processor of a computing device. The computing device includes the processor coupled to a memory, a communications module, and an input device. The method includes receiving a first input from the input device representing a request from a request initiator to access funds for use in a transaction, requesting and receiving, via the communications module, financial health data associated with the request initiator, and determining a second input for accessing the funds. The second input is received from the input device and has a complexity dependent on the financial health data. The method also includes facilitating access to the funds when the second input is received.

In another aspect, there is provided non-transitory computer readable medium for facilitating access to electronic data. The computer readable medium includes computer executable instructions for receiving a first input from an input device representing a request from a request initiator to access funds for use in a transaction, requesting and receiving financial health data associated with the request initiator, and determining a second input for accessing the funds. The second input is received from the input device and has a complexity dependent on the financial health data. The computer readable medium also includes computer executable instructions for facilitating access to the funds when the second input is received.

In certain example embodiments, context data of the transaction is obtained, and the complexity of the second input is further dependent on the context data.

FIG. 1 illustrates an exemplary computing environment 100. In one aspect, the computing environment 100 may include one or more client devices 104, a system 140 associated with a business entity 190, a cryptographic infrastructure 172, a merchant system 174, and a communication network 120 connecting one or more of the components of the computing environment 100.

In certain example embodiments, client devices 104 may be one or more computer systems configured to process and store information and execute software instructions to perform one or more processes consistent with the disclosed embodiments. Client devices 104 may be associated with one or more users 110. Users 110 can include both real and/or virtual/automated entities or organizations (e.g. businesses, corporations, etc.) and these real and/or virtual/automated entities may also be referred to herein as purchasing entities when engaging in a computing session wherein a purchase is being contemplated, researched, executed, etc. The computing environment 100 may include multiple client devices 104, each associated with a separate user 110 or with one or more users 110. In certain embodiments, user 110 may operate client device 104 such that client device 104 performs one or more processes consistent with the disclosed embodiments. For example, a consumer or user 110 may use client device 104 to browse sites associated with merchant systems 174 via e-commerce websites or within applications (commonly referred to as "apps"), and perform transactions involving one or more accounts associated with user 110 and/or other users that are provided, maintained, managed, and/or processed by system 140. In certain example embodiments, client device 104 can include, but is not limited to, a personal computer, a laptop computer, a tablet computer, a notebook computer, a handheld computer, a personal digital assistant, a portable navigation device, a mobile phone, a wearable device, a gaming device, an embedded device, a smart phone, a point of sale terminal, computing systems of a merchant, and any additional or alternate computing device, and may be operable to transmit and receive data across communication network 120.

Communication network 120 may include a telephone network, cellular, and/or data communication network to connect different types of client devices 104. For example, the communication network 120 may include a private or public switched telephone network (PSTN), mobile network (e.g., code division multiple access (CDMA) network, global system for mobile communications (GSM) network, and/or any 3G or 4G wireless carrier network, etc.), WiFi or other similar wireless network, and a private and/or public wide area network (e.g., the Internet).

In certain example embodiments, system 140 may be one or more computer systems configured to process and store information and execute software instructions to perform one or more processes consistent with the disclosed embodiments. In certain embodiments, although not required, system 140 may be associated with one or more business entities, such as business entity 190. In certain embodiments, business entity 190 may be any type of business entity. For example, system 140 may be a system associated with a commercial bank or other financial institution, a retailer, or some other type of business.

While certain aspects of the disclosed embodiments are described in connection with business entity 190 as a financial institution (e.g., commercial bank) that provides financial services accounts to users 110 and processes financial transactions associated with those financial service accounts, the disclosed embodiments are not so limited. In other embodiments, system 140 may be associated with a business entity 190 that provides customer or user accounts, such as retailers, merchants and other consumer and/or commercial service providers.

In the configuration for the computing environment 100 shown in FIG. 1, the merchant system 174 represents an entity with which the client device 104 interacts to browse, review and potentially obtain a product or service, e.g., via an online web page or application; whereas the business entity 190 represents another entity that is in possession of financial health data 162 associated with a purchasing entity such as the user 110 depicted in FIG. 1. The business entity 190 can be a financial institution or other types of entities as indicated above. It can also be appreciated that both the merchant system 174 and business entity 190 can be financial institutions, e.g., where one financial product or service offered by one financial institution is being browsed for potential purchase, while the financial health data 162 for the purchasing entity is determinable from data available to (or created by) another financial institution such as one providing personal banking and/or credit products.

The system 140 may include one or more servers to facilitate or carry out a service requested by user 110 via the client device 104. Exemplary servers include a mobile application server 142, a web server 146 and a data server 150. The system 140 may also include a cryptographic server 170 for performing cryptographic operations and providing cryptographic services. The cryptographic server 170 can also be configured to communicate and operate with a cryptographic infrastructure 172. The system 140 may also include one or more data storages for storing and providing data for use in such services, such as data storage 152.

Mobile application server 142 supports interactions with a mobile application installed on client device 104. Mobile application server 142 can access other resources of system 140 to carry out requests made by, and to provide content and data to, a mobile application on client device 104. In certain example embodiments, mobile application server 142 supports a mobile banking application to provide payments from one or more accounts of user 110.

Web server 146 supports interactions using a website accessed by an internet browser running on the client device 104. For example, a user 110 may access a merchant's webpage to purchase products and services online. In another example, the web server 146 may support a digital wallet provider in which user 110 can arrange for payment from one or more accounts registered with the digital wallet provider.

In certain example embodiments, either or both mobile application server 142 and web server 146 can access resources of system 140 to carry out requests made by, and provide content and data to, a purchasing entity such as client device 104, e.g., to provide financial health data 162 associated with the purchasing entity.

Figure 2:
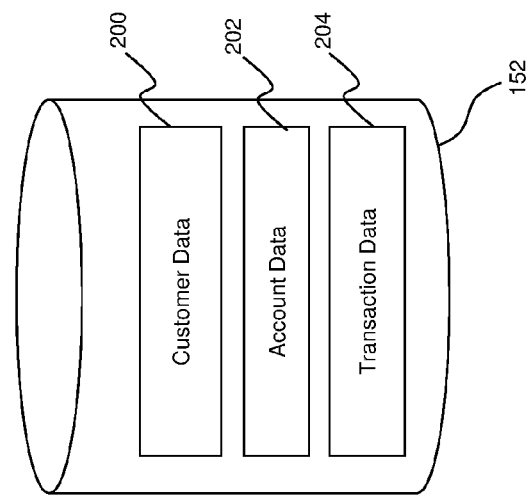
FIG. 2 is a block diagram of example data components of a data storage.

Data storage 152 may include one or more data storage devices configured to store information consistent with the disclosed embodiments. In an example embodiment shown in FIG. 2, data storage 152 may include customer data 200, account data 202, and transaction data 204. In one aspect, customer data 200 may include one or more data records uniquely identifying one or more users 110 of business entity 190 associated with system 140. By way of example, a customer of a financial institution (e.g., business entity 190) may access a web page associated with system 140 (e.g., through web server 146), and subsequently register for online banking services and provide data. The data may be linked to the customer and stored within customer data 200.

In certain example embodiments, customer data 200 may include personal information associated with a user 110 (e.g., a name, home address, or date of birth), demographic information (e.g., educational level, income level), government-issued identifiers (e.g., driver's license numbers or Social Security numbers), employment information (e.g., employer name or address), and/or contact information (e.g., e-mail addresses, home numbers, work numbers, or mobile numbers). Other types of customer information may be stored and used.

Customer data 200 may include client device identification information identifying one or more client devices 104 registered to user 110. In one embodiment, the user may provide the client device identification information (e.g., a mobile telephone number provided by the user when registering for online banking services). Alternatively, system 140 may be configured to execute processes that automatically collect client device identification information (e.g., collecting an Internet Protocol (IP) address associated with the customer's smartphone by web server 146).

In certain example embodiments, customer data 200 may include geographic position data associated with user 110 and/or at least one of the client devices 104 registered to user 110. For instance, the geographic position data may identify a current geographic position of user 110 and/or the client devices 104, and additionally or alternatively, one or more prior geographic positions of user 110 and/or the client devices 104. In certain example embodiments, system 140 may obtain a portion of the geographic position data from client device 104 across communication network 120. By way of example, client device 104 may include a global position system (e.g., a GPS) that tracks a current geographic position of client device 104, and client device 104 may transmit geographic position data indicative of the current geographic position of client device 104 to system 140 across communication network 120. For instance, client device 104 may append the geographic position data to data transmitted to system 140 in response to a completed transaction, and/or a required update to system 140. In other instances, client device 104 may transmit the geographic position data to a third-party system (e.g., a mobile telecommunications provider), and system 140 may obtain portions of the geographic position data from the third-party system across network 140 through an appropriate application programming interface (API). Upon receipt of the geographic position data from client device 104 and/or the third-party system, system 140 may be configured to format and store the received positional information within data storage 152 (e.g., as portions of customer data 200).

In certain example embodiments, account data 202 may include information identifying one or more accounts of customers of a financial institution (e.g., business entity 190) associated with system 140. In one embodiment, account identification information may include financial service account information. For example, such service account information may include a chequing account, a savings account, a revolving credit line, an account linked to a credit or debit card, a brokerage account, a wealth account, an investment account, mortgage product and any additional or alternate account provided or supported by the issuing bank. In other embodiments, account data 202 may include information identifying investment portfolios held by one or more customers of the financial institution (e.g., positions in one or more securities held by the customers). Information within account data 202 may also identify, for a single customer, one or more accounts associated with the customer and account data corresponding to the accounts (e.g., account, expiration date information, and/or card security codes, account balance information, and/or credit limit information).

In other aspects, account data 202 may include account information associated with nonfinancial service accounts, such as online customer or loyalty program accounts for retailers, merchants or other services or activities.

Transaction data 204 may include information identifying one or more transactions involving one or more customers or accounts of business entity 190 associated with system 140. In one embodiment, such transactions may include, but are not limited to, purchase transactions (e.g., purchases of products and/or services from electronic or physical retailers), financial service transactions (e.g., fund transfers), bill payment transactions (e.g., electronic bill payment transactions), financial instrument or security transactions (e.g., purchases of securities), deposits or withdrawals of funds, or applications for credit from the financial institution or other entity.

Referring back to FIG. 1, data server 160 stores financial health data 162 and provides access to such data to other servers within system 140, and/or other computer systems (e.g., client device 104) outside of system 140 across network 120 through corresponding APIs. Financial health data 162 may include parameters indicative of the financial health of one or more users 110 of business entity 190 associated with system 140. For the sake of simplicity, three different levels or thresholds of financial health may be considered in some of the disclosed embodiment herein, labelled as WEAK, ACCEPTABLE and STRONG. It will be appreciated that additional levels or thresholds of financial health may be determined and used in the disclosed embodiments, and such labels can represent ratios, numbers and other values and quantifications of financial health generated from any suitable means. The disclosed embodiments herein can apply to any suitable means of evaluating and quantifying financial health, and various metrics and parameters may be used.

In certain example embodiments, financial health data 162 may include various ratios of financial data used to evaluate personal financial health (e.g., debt/expenses to income ratios). Financial health data 162 may also compare such ratios against predetermined ratio thresholds associated with different levels or thresholds of financial health of user 110. For example, financial health data 162 may include a monthly debt (e.g., mortgage, loans, credit lines, credit cards, etc.) to gross income ratio, and use a value of 36% as the threshold indicative of ACCEPTABLE financial health. Ratios above 36% can be attributed to WEAK financial health (increasingly weaker as the ratio increases) and below 30% to STRONG financial health (increasingly stronger as the ratio decreases).

In another example, financial health data 162 may include data indicative of whether total monthly expenses exceed net income for user 110. Financial health may be determined by associating a different level of financial health to different amounts (or ranges thereof) of deficient or excess income relative to expenses.

In certain example embodiments, financial health data 162 may include data indicative of the amount of savings (e.g., cash and cash equivalents) accumulated in the accounts of user 110, and the number of months of certain expenses (e.g., mortgage/rent, utilities, groceries, gas, and other reoccurring expenses such as property taxes, tuition, etc.) such accumulated amounts can cover. Financial health data 162 may also compare such number of months against predetermined month thresholds associated with different levels of financial health of user 110. Financial health may be determined by associating a different level of financial health to different number of months (or ranges thereof) of deficient or excess savings relative to monthly expenses. In certain example embodiments, financial health data 162 may also include a rate at which the savings of user 110 is increasing or decreasing. Financial health may be determined by associating a different level of financial health to different rates (or ranges thereof) that savings are being depleted or accumulated.

In certain example embodiments, financial health data 162 can include budgeting data of user 110. For example, budgeting data may include monthly saving targets for specific accounts (e.g., savings account, retirement account, etc.) or for specific goals (e.g., purchase of house, vacation, car, etc.) and indicators of whether such saving targets are being met. Financial health may be determined by associating a different level of financial health to different amounts (or ranges thereof) of deficient or excess savings relative to the savings target. Budgeting data may include monthly spending limits for different categories of expenses (e.g., dining out, entertainment, groceries, transportation, travel, home, health etc.) and an indicator of whether such limits are being exceeded. Financial health may be determined by associating a different level of financial health to different amounts (or ranges thereof) of under or over spending relative to the spending limits. In another example, budgeting data may include a savings goal (defined by an amount and a date by which such amount is to be saved), and an indicator of the progress by user 110 in reaching the savings goal. Financial health may be determined by associating a different level of financial health to different levels of progress in reaching the savings goal.

In certain example embodiments, financial health data 162 that includes budgeting data can take into account the timeframe of a particular savings goal and momentum in savings accumulated, to determine the financial health of user 110. For example, the financial health data 162 may include budgeting data indicating that user 110 has set a goal of saving $12,000 within a 1 year period and that after the first month, only $100 has been saved. At the end of the first month, despite not being on track to reach the savings goal (as the average savings so far has only been $100/month rather than the average monthly savings of $1000/month that would be required to meet the savings goal of $12,000 in 1 year), the financial health data 162 may weight this deficiency in savings less relative to other data used to determine financial health of user 110 given that most of the allotted period to achieve the savings has not yet passed (i.e., 11 of 12 months remain). In another example, the financial health data 162 may include budgeting data indicating that user 110 has set a goal of saving $12,000 within a 1 year period and that savings have been accumulated as follows: $0 up to month 6, $1000 in month 7, $2000 in month 8, $3000 in month 9. At the end of month 9, despite not being on track to reach the savings goal when evaluated based on monthly savings (as the average savings so far has only been $667/month rather than the average monthly savings of $1000/month that would be required to meet the savings goal of $12,000/year), the financial health data 162 may weight this deficiency in savings less in comparison to other data used to determine financial health of user 110 given the momentum/trend in recent months to be saving increasingly larger amounts.

In certain example embodiments, data server 160 generates financial health data 162 from customer data 200, account data 202 and/or transaction data 204 stored in data storage 152. In certain example embodiments, other servers or computing systems that can access data storage 152 may generate and store financial health data 162. For example, in certain example embodiments, client device 110 can access the data storage 152 across network 120 through a corresponding API provided by system 140 to generate financial health data 162 and store such data in memory of the client device 104.

System 140 may also include a cryptographic server 170 for performing cryptographic operations and providing cryptographic services (e.g., authentication (via digital signatures), data protection (via encryption), etc.) to provide a secure interaction channel and interaction session, etc. The cryptographic server 170 can also be configured to communicate and operate with a cryptographic infrastructure 172, such as a public key infrastructure (PKI), certificate authority (CA), certificate revocation service, signing authority, key server, etc. The cryptographic server 170 and cryptographic infrastructure 172 can be used to protect the various data communications described herein, to secure communication channels therefor, authenticate parties, manage digital certificates for such parties, manage keys (e.g., public and private keys in a PKI), and perform other cryptographic operations that are required or desired for particular applications of the system 140. The cryptographic server 170 may be used to protect the customer data 200, account data 202, transaction data 204, and financial health data by way of encryption for data protection, digital signatures or message digests for data integrity, and by using digital certificates to authenticate the identity of the users 110 and client devices 104 with which the system 140 communicates to inhibit data breaches by adversaries. It can be appreciated that various cryptographic mechanisms and protocols can be chosen and implemented to suit the constraints and requirements of the particular deployment of the system 140 as is known in the art.

Figure 3:
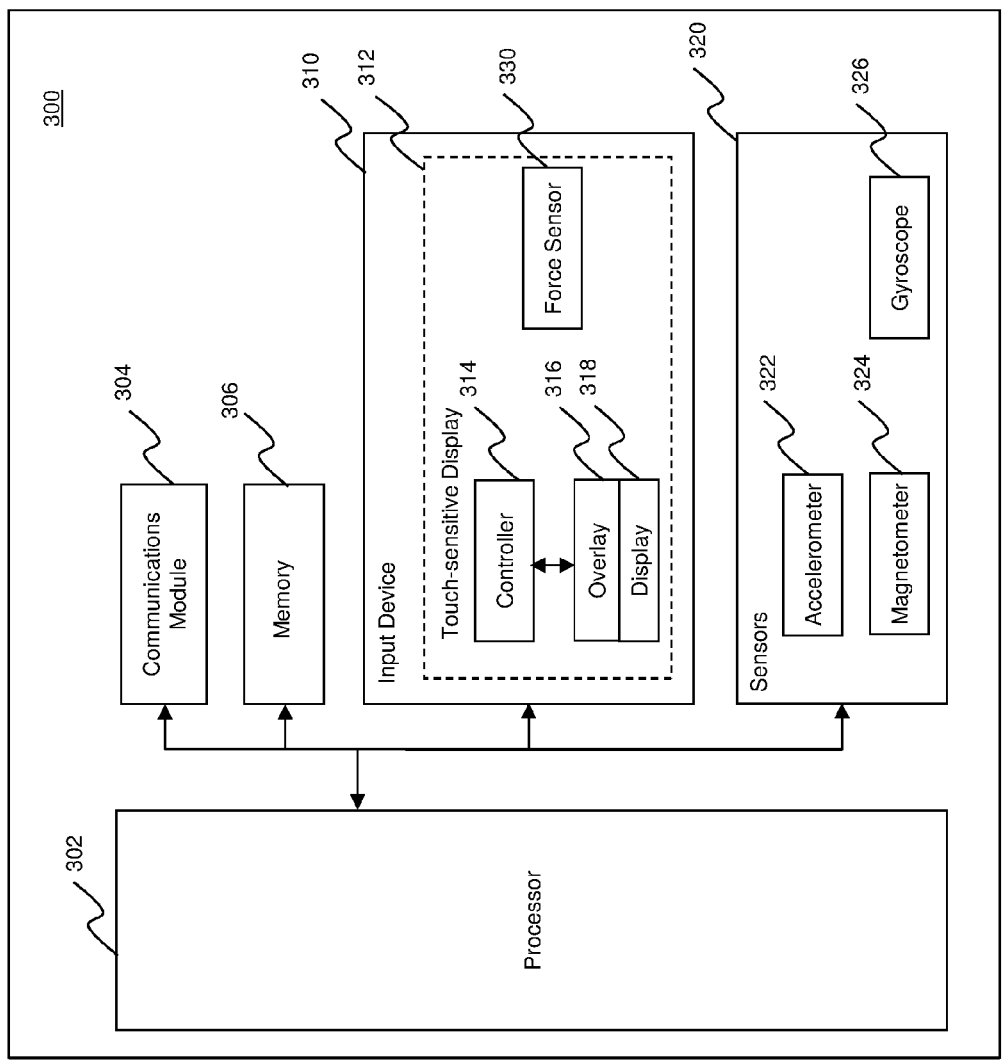
FIG. 3 is a block diagram of an example computing system.

FIG. 3 illustrates an example computer system 300. Computer system 300 may reflect computer systems and computing devices associated with system 140, mobile application server 142, web server 148, data server 160, cryptographic server 170, merchant system 174, and client device 104. As such, the processes and operations described herein may be operable on or adapted to be operable on a computer system 300 located at and used by/for any of the entities shown in FIG. 1 (see also FIGS. 5A-5C described below).

In certain example embodiments, computer system 300 may include one or more processors 302 coupled to a communications module 304, a memory device 306, an input device 310 and one or more sensors 320. Communications module 304 enables the computer system 300 to communicate with one or more other components of computing environment 100, such as client device 104 or system 140 (or one of its components), via a bus or other communication network, such as communication network 120. Memory device 306 can include tangible and non-transitory computer-readable medium having stored therein computer programs, sets of instructions, code, or data to be executed by processor 302. Input device 310 provides a mechanism for a user of the computer system 300 to provide inputs to the computer system 300, such as during the execution of computer programs stored in memory device 306. Input device 310 can include a touch-sensitive display 312, keyboard, keypad, mouse, microphone, or other device capable of receiving or detecting an input. The computer system 300 may also include one or more sensors 320 coupled to processor 302, such as an accelerometer 322, magnetometer 324 and gyroscope 326. The sensors 320 can be used to determine an orientation and/or movement of the computer system 300 (e.g., client device 104 in the form of a smartphone).

The touch-sensitive display 312 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. In certain example embodiments, the touch-sensitive display 312 is a capacitive touch-sensitive display which includes a controller 314, and a capacitive touch-sensitive overlay 316 over a display 318. The overlay 316 may be an assembly of multiple layers in a stack which may include, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as gestures, may be detected by the touch-sensitive display 312. A gesture may be detected from any suitable object, such as a finger, thumb, appendage, or other items, for example, a stylus, pen, or other pointer, depending on the nature of the touch-sensitive display 312. The location of the gesture moves as the detected object moves during a gesture. Changes in the capacitive touch-sensitive overlay 316 are provided to a controller 314 when a gesture is received. The controller 314 and/or the processor 302 process the changes in the capacitive touch-sensitive overlay 316 to detect a touch by any suitable contact member on the touch-sensitive display 312. The processor 302 may determine attributes of the gesture, including a location of a touch. Touch location data may include an area of contact or a single point of contact, such as a point at or near a center of the area of contact, known as the centroid. Similarly, multiple simultaneous touches can be detected (referred to as multi-touch gestures).

If the gesture spans more than one location of the touch-sensitive display 312, the gesture may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture.

Example gestures include a tap, a swipe, a pinch, and multi-touch variations thereof (e.g., more than one tap simultaneously at different locations of the touch-screen display 312). Gestures can also have a specific pattern or path on the touch-screen display 312, having different directions at different parts of the gesture. The touch-sensitive overlay 316 may evaluate gestures at certain intervals or points along its path rather than using each of location or point of contact over the duration of the gesture to resolve a direction or other attributes.

In some examples, the touch-sensitive display 312 may include one or more force sensors 330 disposed in any suitable location to detect a force imparted by a gesture on the touch-sensitive display 312. The force sensor 330 may include a force-sensitive resistor, strain gauge, piezoelectric or piezoresistive device, pressure sensor, or other suitable device or technology used to measure force. Force as utilized throughout the specification refers to force measurements, estimates, and/or calculations, such as pressure, deformation, stress, strain, force density, force-area relationships, thrust, torque, and other effects that include force or related quantities.

Force information related to a detected gesture may be utilized to select information, such as information associated with a location of a gesture. For example, a gesture that does not meet a force threshold may highlight a selection option, whereas a gesture that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming. In certain example embodiments, the magnitude of force of a gesture may be used to infer a state of the user providing the gesture (e.g., a stronger force can indicate an urgency of the user in causing the computer system 300 to perform the function associated with the gesture.

Figure 4:
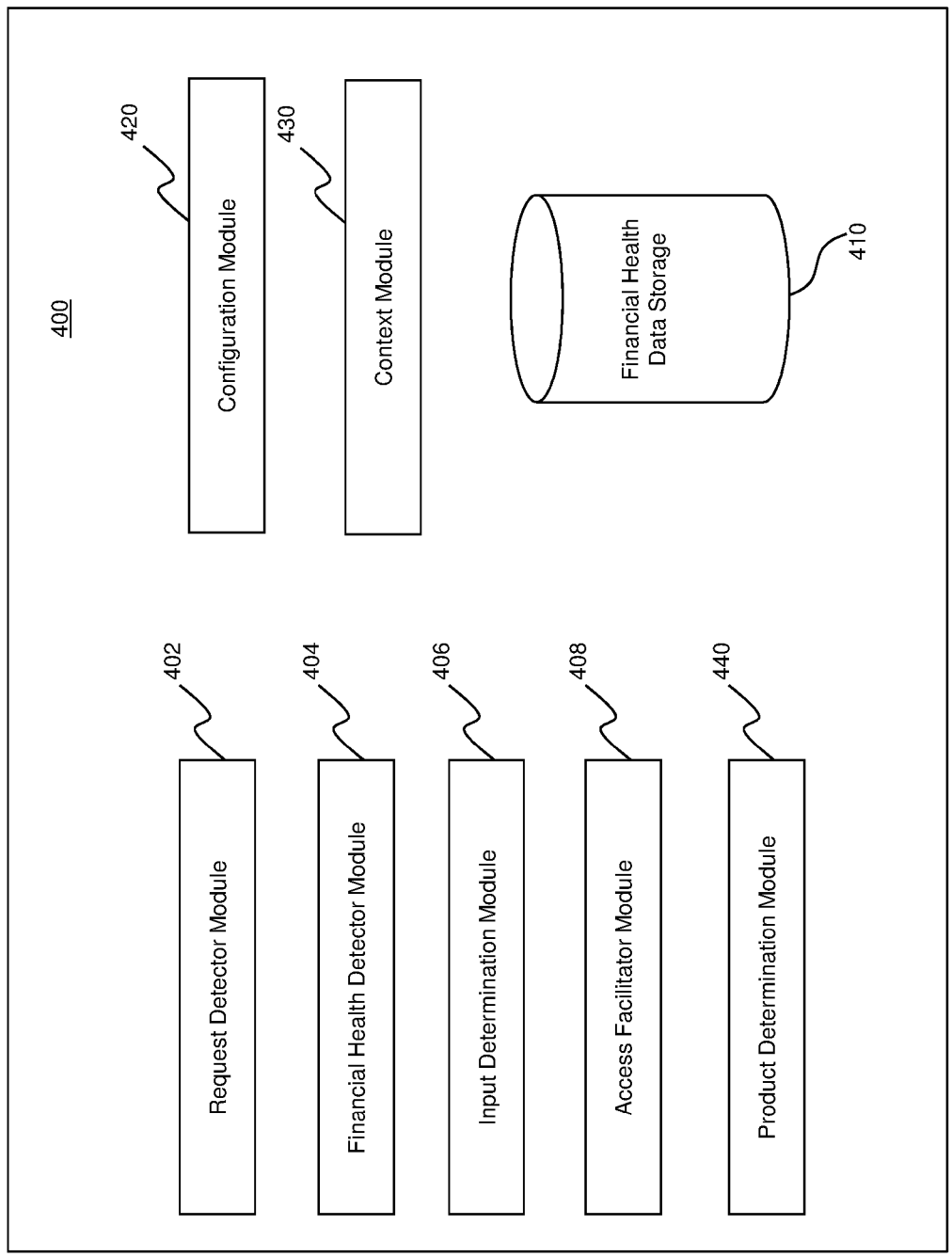
FIG. 4 is a block diagram of an example configuration of a fund access module.
Figure 5A:
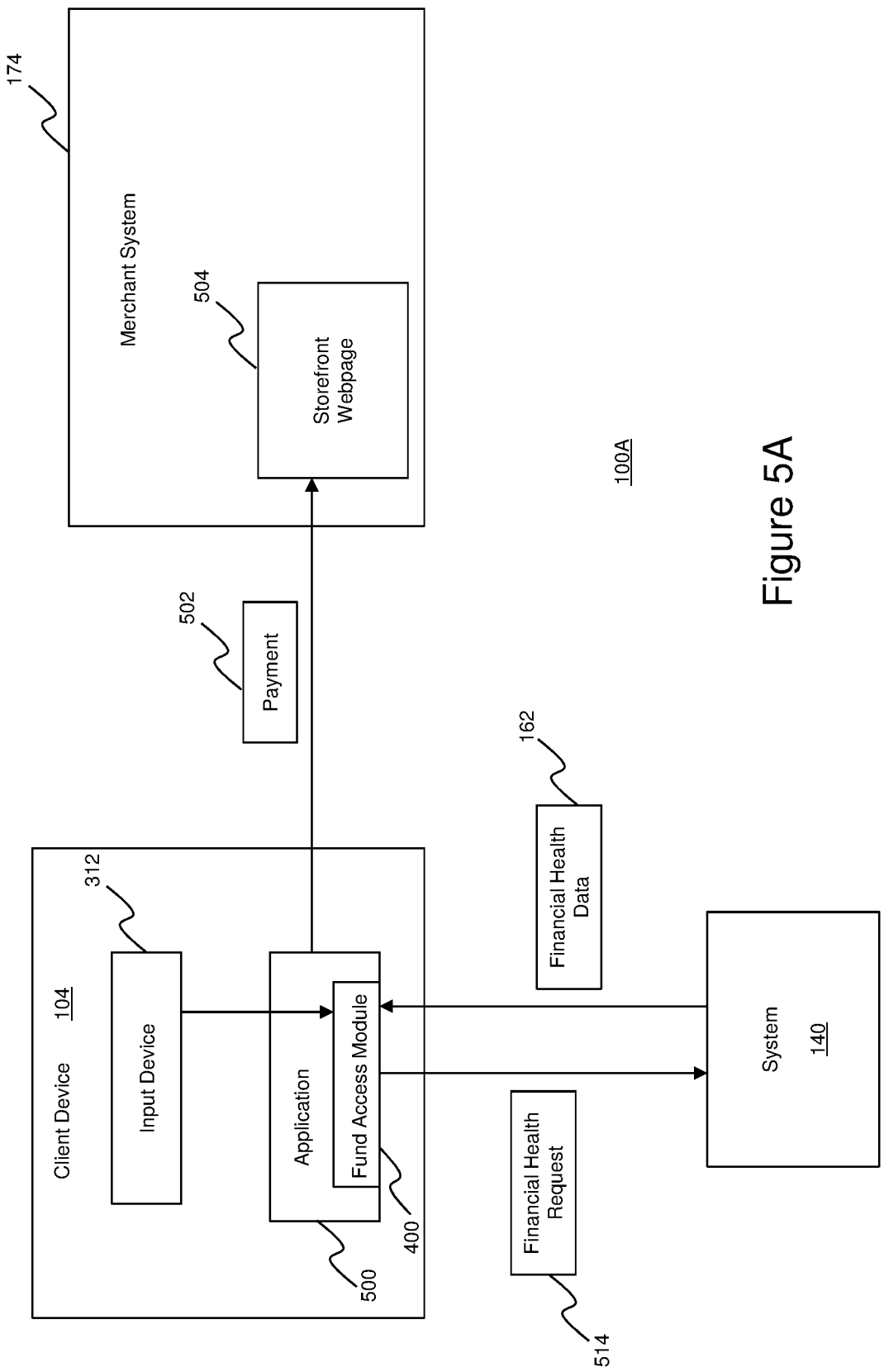
FIGS. 5A-5C are schematic diagrams of example computing environments configured to determine a second input required for accessing funds.
Figure 5B:
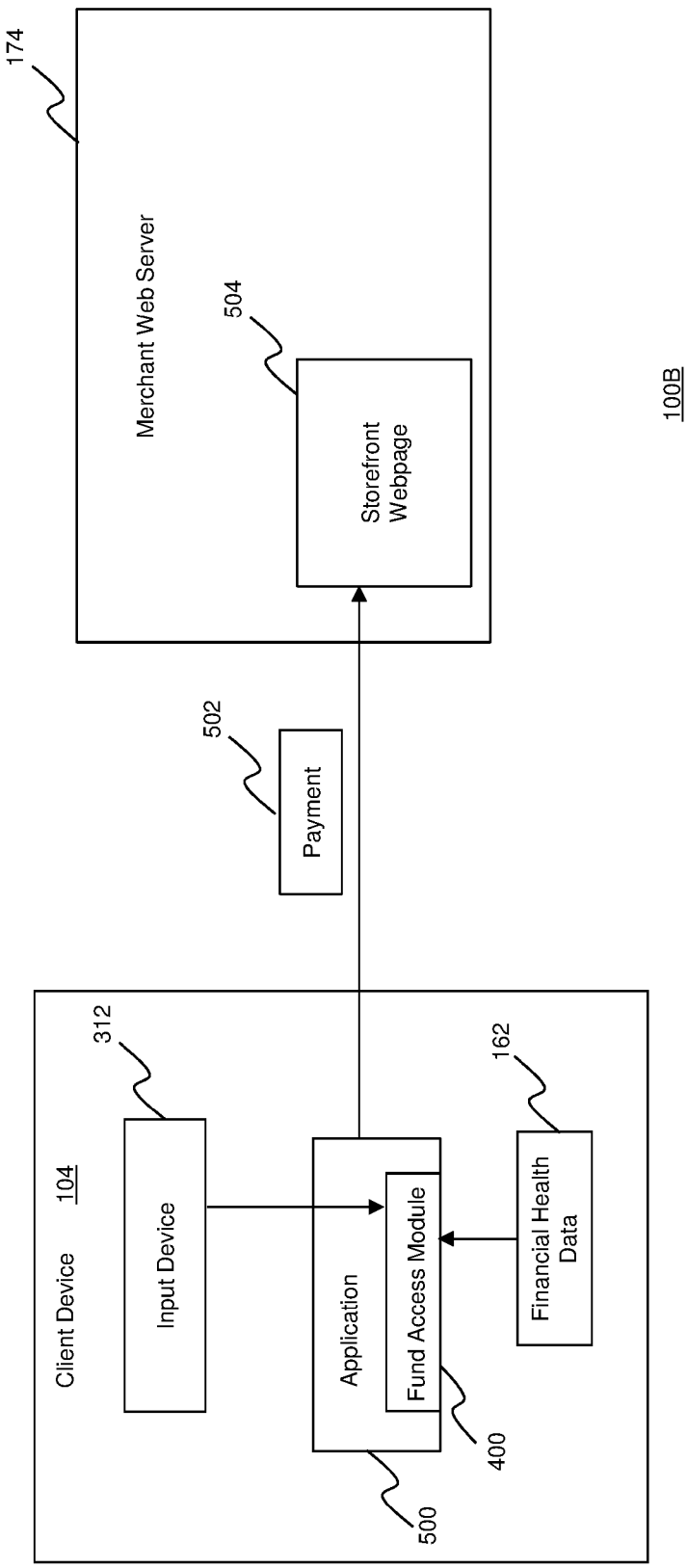
Figure 5C:
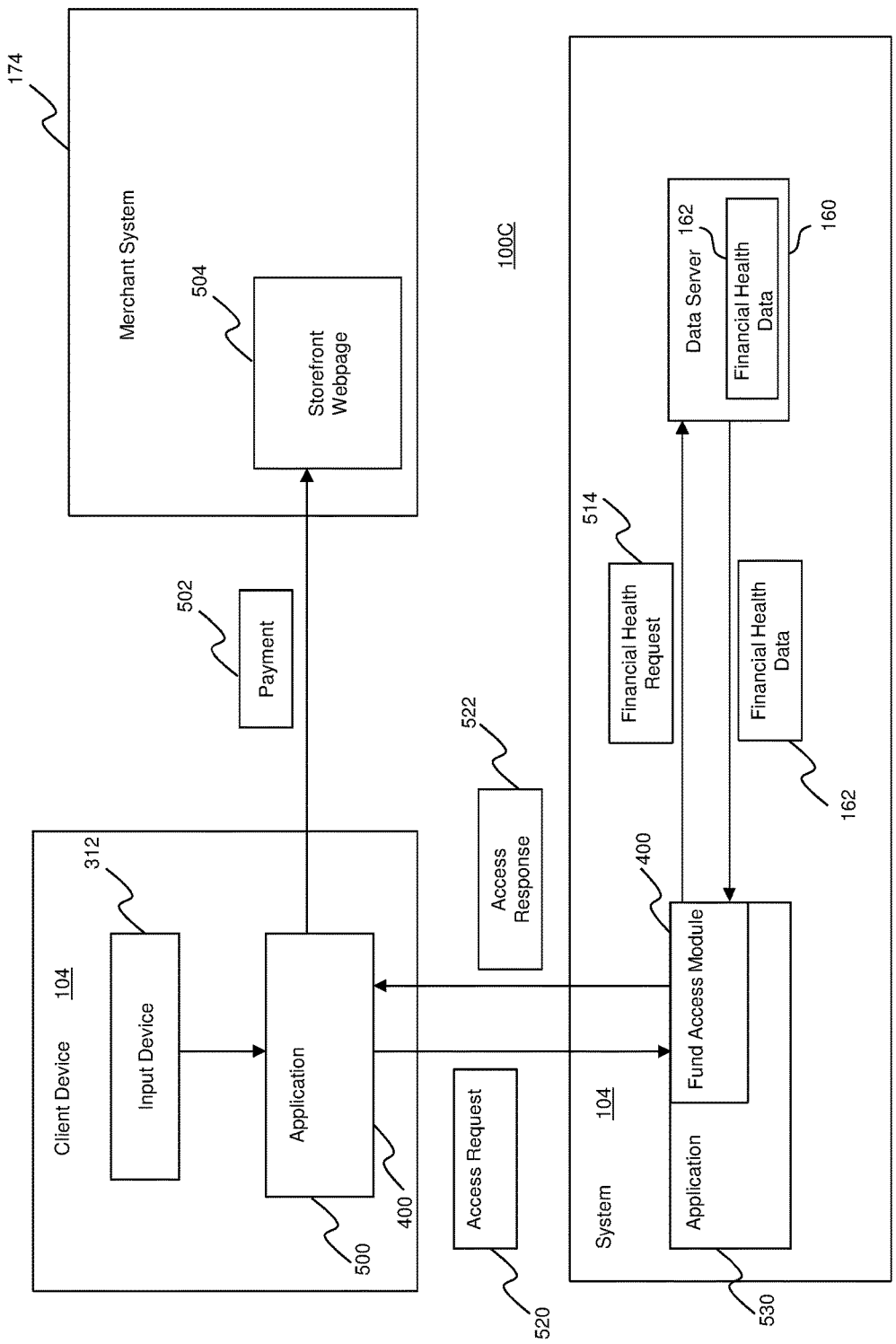

In FIG. 4, an example configuration of fund access module 400 is shown. The fund access module 400 may be a standalone application, which may in turn interacts with another software application through a corresponding API, or may be part of another software application stored in memory 306, as depicted in FIGS. 5A-5C described below. In certain example embodiments, fund access module 400 is part of a mobile application stored on client device 104 used to make payments to purchase products and services. For example, the fund access module 400 may be part of a banking mobile application, merchant mobile application, or digital wallet mobile application. In other example embodiments, the fund access module 400 may be part of software installed on other types of computer systems 300, such a laptop, computer, point of sale terminal, web servers supporting payments on e-commerce websites, and other computer systems that include purchasing capabilities.

Fund access module 400 includes a request detector module 402, a financial health detector module 404, an input determination module 406, and an access facilitator module 408.

Request detector module 402 receives an input from an input device 310 representing a request by a request initiator (e.g. user 110 or other purchasing entity) to access funds for use in a transaction. In certain example embodiments, the request detector module 402 monitors the activities performed by client device 104 to identify when a request to access funds is being made by user 110. For example, the request detector module 402 can monitor the activity of other applications running on client device 104 (e.g., use of digital wallet application to make a payment, internet browser for online purchasing activity, etc.).

Financial health detector module 404 obtains financial health data 162 associated with the request initiator. In certain example embodiments, financial health detector module 404 can request and receive financial health data 162 from data server 160 via the network 120 through a corresponding API.

In certain example embodiments, financial health detector module 404 can generate financial health data 162 from customer data 200, account data 202 and/or transaction data 204 by accessing data storage 152 across network 120 through a corresponding API and store such data in financial health data storage 410. In other example embodiments, the financial health detector module 162 can obtain financial health data 162 from the device 104 itself as shown in FIG. 5B described later.

Input determination module 406 determines an additional input required for accessing the funds being requested. In certain example embodiments, the input determined may be performed using the same input device as the initial request to access funds received by request detector module 402. In another example embodiment, the input determined may be performed using a different input device, if multiple input devices are available.

Access facilitator module 408 facilitates access to the funds when the determined input of input determination module 406 has been received.

In certain example embodiments, fund access module 400 may include a product determination module 440. The product determination module 440 can determine a financial product to offer to the request initiator (e.g. user 110 or other purchase entity) based on the financial health data 162 of the request initiator. In certain example embodiments, the fund determination module 440 can use context data in determining the financial product, including a priority indictor determined from the context data.

In certain example embodiments, fund access module 400 may include a configuration module 420 and a context module 430. The configuration module 420 can provide settings to control various operations of fund access module 400. For example, configuration module 420 may provide settings regarding the types of requests received by the request detector module 402 that trigger further execution of the fund access module 400. In certain example embodiments, the fund access module 400 can be configured to only determine an additional input for requesting access to the funds or offer a financial product to provide an alternative source of funds, when certain criteria are met (e.g., requested funds are above a certain amount threshold, relate to payments for certain types of purchases, requested funds are from certain sources, etc.). The configuration module 420 may also provide settings for: specifying the source(s) from which to retrieve financial health data 162, the types of financial health data 162 or criteria (e.g., threshold values) to use for evaluating financial health, etc. The configuration module 420 may also provide settings specifying characteristics of the additional input that can be determined by the input determination module 406, such as specifying the properties that can be adjusted (e.g., number of taps, force, duration, pattern of gesture inputs), limiting the inputs to specific types (e.g., gestures, text input, audio/voice inputs, physical movement of the client device 110, etc.). The configuration module 420 may also provide settings specifying characteristics of the financial products that can offered by product determination module 440, such as limiting the financial products to certain types, from certain providers, or to modifications of existing products of the request initiator. In certain example embodiments, the configuration module 400 displays a corresponding graphical user interface (e.g., on touch-sensitive display 312) to enable a user 110 of the client device 104 to set the configuration settings. In certain example embodiments, the configuration settings may be set by business entity 190.

The context module 430 receives or determines context data associated with a transaction for which the requested funds are to be used. The context data for a transaction can include numerous information related to the transaction, such as information on the product or service being purchased, the location where the transaction is taking place, whether similar or related purchases or transactions have been completed in the past, other metadata, etc.

In certain example embodiments, the context module 430 may request and receive context data from other applications running on client device 104, or from other computer systems and servers across network 120 through corresponding APIs.

In certain example embodiments, the context module 430 analyzes the context data to determine a priority indicator of the transaction and such priority indicator can be used by the input determination module 406 to adjust the complexity of the additional input required to access the funds based on the urgency of the transaction (as indicated by the priority indicator).

It will be appreciated that fund access module 400 may be incorporated into a single computer or a single server or service, or alternatively, may be distributed among one or more computing systems 300. In certain example embodiments, fund access module 400 (or a module thereof as shown in FIG. 4) may be implemented as one or more software programs, such as a software application (e.g., a web service or mobile application) executed by one or more processors included in one of the other servers of system 140, client device 104, or another server or computer system 300.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of any of the servers in system 140 or client device 104, or accessible or connectable thereto. Any application or module herein described may be implemented using computer readable/executable instructions that may be stored or otherwise held by such computer readable media.

The operations of fund access module 400 (e.g. determination of a second input for accessing funds having a complexity dependent on financial health data 162, determining a financial product based on financial health data 162) can be performed in various configurations. FIGS. 5A-5C provide example embodiments in which the fund access module 400 can be incorporated into respective computing environments 100A-100C. It can be appreciated that some modules and components from the client device 104, merchant system 174 and system 140 are omitted from FIGS. 5A-5C for ease of illustration.

In FIG. 5A, the fund access module 400 is embedded or otherwise included in or accessible to an application 500 on the client device 104, e.g., a mobile wallet application stored in memory 306. Similarly, the fund access module 400 can be embodied as any software component that is embedded or accessible to any application 500 that is capable of providing a payment (e.g. to merchant system 174).

The fund access module 400 in this example embodiment is configured to be in communication with a storefront webpage 504 at the payment stage of a purchase transaction (e.g., to arrange for payment 502 for the purchase a product for sale on the storefront webpage 504). For example, the client device 104 may be a smart phone, tablet or laptop computer or desktop computer that is being used to browse an e-commerce website wherein the fund access module 400 detects that the purchasing entity operating the client device 104 is at the check-out stage of a transaction on the website and operates as described herein to determine a second input for accessing funds to be used as payment or to determine a financial product to offer as an alternative source of funds for payment.

The fund access module 400 is also configured to be in communication with system 140, e.g., by accessing communications module 304 of the client device 104. The fund access module 400 can generate and send a financial health request 514 for financial health data 162 associated with the purchasing entity to the system 140 and receive financial health data 162 returned by system 140.

In certain example embodiments, the fund access module 400 may be operable at the client device 104, similar to FIG. 5A, but may obtain financial health data 162 at the client device 104 as shown in FIG. 5B. In the example embodiment shown in FIG. 5B, financial health data 162 is available on the client device 104 without requiring a separate communication by the client device 104 with the system 140. When financial health data 162 can be determined from the activities of the client device 104 or from application data available or generated on the client device 104, the fund access module 400 can arrange for payment 502 without requiring access to the system 140. For example, the application 500 may be a mobile wallet application that is frequently used to make payments for the purchasing entity operating the client device 104 such that the transactions history available to application 500 can be used to generate financial health data 162. In other certain example embodiments, the implementation depicted in FIG. 5B may represent a scenario wherein the financial health data 162 is received periodically from the system 140 or from another third-party service.

FIG. 5C illustrates another example embodiment wherein the fund access module 400 is embedded or otherwise included in or accessible to a server application 530 on a server of the system 140 (e.g., mobile application server 142 or web server 146). The fund access module 400 in this example embodiment is configured to be in communication with an application 500 on the client device 104 (e.g., a mobile wallet application) which receives an input from the purchasing entity operating the client device 104 to request access to funds for use in a transaction. Application 500 generates and sends a corresponding access request 520 to fund access module 400. The fund access module 400 is also configured to be in communication with the data server 162 and can generate and send a financial health request 514 for financial health data 162 and receive financial health data 162 returned by data server 162. In certain example embodiments, server application 530 may be running on data server 162. Fund access module 400 can use the financial health data 162 to generate and send an access response 522 to the application 500. In certain example embodiments, the access response 522 can include a request for a second input required for accessing the requested funds, and in response to receiving the access response 522, application 500 can prompt the purchasing entity operating the client device 104 to provide the second input on the input device 312 in order for payment 502 to be provided to the merchant system 174. In certain example embodiments, the access response 522 can include an offer to a financial product to use as an alternative source of funds and in response to receiving the access response 522, application 500 can display an offer of financial product for the purchasing entity operating the client device 104.

Figure 6:
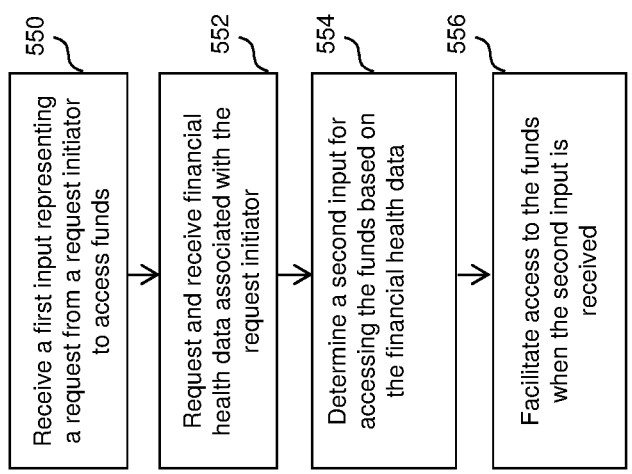
FIG. 6 is a flow diagram of an example of computer executable instructions for facilitating access to funds.

Referring to FIG. 6, an example embodiment of computer executable instructions for facilitating access to funds is shown. At block 550, the request detector module 402 receives a first input from an input device 310 representing a request from a request initiator to access funds for use in a transaction. For example, the first input can be a selection by user 110 of a specific form of payment (e.g., debit card and associated bank account) to pay for a purchase with an online merchant using the internet browser or merchant-specific mobile application running on client device 104. In another example, the first input can be the selection by user 110 of a specific form of payment within a digital wallet contactless payment application running on client device 104 to pay for a purchase at a point of sale terminal of a retail location.

At block 552, financial health detector module 404 requests and receives, via the communications module 304, financial health data 162 associated with the request initiator. In certain example embodiments, client device 104 requests financial health data 162 associated with the user 110 across network 120 from data server 160. Data server 160 retrieves financial health data 162 associated with user 110 and sends such data across network 120 to client device 104. For example, a user 110 may access a mobile application running on client device 104 to purchase a pair of shoes for $200. Financial health detector module 404 sends a request to data server 160 for financial health data 162 of user 110. The financial health data 162 accessible to data sever 160 includes budgeting data that user 110 has set a spending limit of $500/month on clothing (which includes shoes) and that the amount spent so far in the month is $350 (i.e., limit has not been reached). Therefore, data server 160 sends financial health data 162 indicating ACCEPTABLE financial health to client device 104 (for use by financial health detector module 404).

In certain example embodiments, financial health detector module 404 can update and modify financial health data 162 received from data server 160 to reflect use of the funds being requested. Taking the example above in which client device 104 receives financial health data 162 indicating ACCEPTABLE financial health (since only $350 of the $500/month spending limit has been used), financial health detector module 404 may update the financial health data 162 to indicate WEAK financial health given that the amount of funds being requested (i.e., $200) when added to the current monthly spend (i.e., $350) would exceeded the budgeted monthly spending limit allocated for clothing (i.e., $500).

In certain example embodiments, financial health data 162 received from data server 160 will incorporate the impact of using the funds being requested in the transaction. The financial health detector module 404 can send information regarding the transaction (e.g., amount of funds being requested, nature of the products or services being purchased) via the communications module 304 of client device 104 across network 120 to data server 160. Data server 160 can then use the transaction information to modify or generate additional financial health data 162 that considers the impact of using the requested funds. Taking the example scenario of user 110 setting a spending limit of $500/month on clothing of which user 110 has already spent $350, data server 160 can incorporate the request of $200 for the purchase of shoes into financial health data 162 to be sent to client device 104. For example, data server 160 may determine that the transaction, if completed, would result in the monthly budget for clothing to be exceeded (i.e., $200 added to the current monthly spend of $350 would total $550, which exceeds the monthly spending limit of $500) and thus update the financial health data 162 to indicate WEAK financial health.

At block 554, input determination module 406 determines a second input for accessing the funds. The second input has a complexity dependent on the financial health data 162. In certain example embodiment, the second input required for accessing the funds includes one or more taps on the touch-sensitive display 312 of client device 104. In this example, the complexity in the second input includes the number of taps required.

In certain example embodiments, the financial health data 162 may include a debt-to-income ratio used to evaluate the financial health of user 110. If the financial health data 162 indicates an ACCEPTABLE financial health (i.e., debt-to-income ratio equal to a predetermined ratio threshold associated with acceptable financial health), the second input can be determined to be a default number of taps. If the financial health data 162 indicates WEAK financial health (i.e., debt-to-income ratio is above the predetermined ratio threshold associated with acceptable financial health), the second input can be determined to include additional taps on the touch-sensitive display 312. For example, one additional tap may be added to the second input for each 1% above the predetermined ratio threshold. In another example embodiment, the number of additional taps may be added in a non-linear manner relatively to the difference in the debt-to-income ratio and the predetermined ratio threshold (e.g., number of taps added per % above the predetermined ratio threshold increases for larger debt-to-income ratios). If the financial health data 162 indicates STRONG financial health (i.e., debt-to-income ratio is below the predetermined ratio threshold associated with acceptable financial health), the number of taps required by the second input can be reduced from the default number of taps.

FIGS. 7A-7D illustrates an example graphical user interface 600 of a digital wallet application (or other application related to making a payment), displayed on the touch-sensitive display 312 of client device 104. The touch-sensitive display 312 displays a confirmation screen 610 to use a debit card to pay for a purchase (after the client device 104 has already received previous inputs to initiate the purchase and select the form of payment). User 110 must select the OK button 612 in order for the payment to be made. In this example, the second input to be determined is selected from 40, 3, and 1 successive taps corresponding to WEAK, ACCEPTABLE, STRONG financial health levels, respectively.

Figures 7A, 7B:
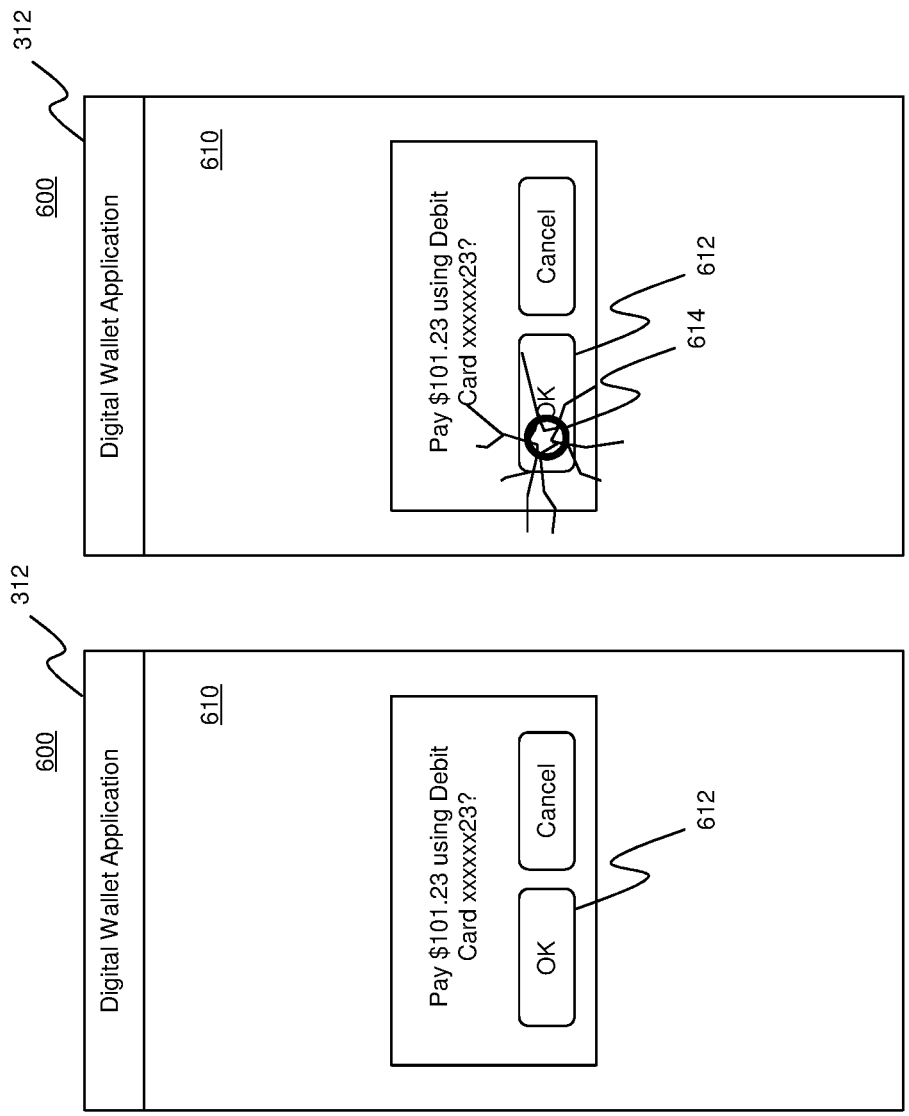

In the example scenario of FIG. 7A-7D, the financial health data 162 received by the client device 104 from data server 162 indicates that the financial health of user 110 is WEAK and thus determines the second input required for accessing the funds to be 40 successive taps before the OK button 612 can be selected. In certain example embodiments, the input determination module 406 may also cause the touch-sensitive display 312 to display an animation or other visual indicator to indicate the progress of performing the second input. FIGS. 7B and 7C illustrate an example embodiment where each tap 614 causes the touch-sensitive display 312 to display an animation of glass breaking (and remaining image of broken glass) in the vicinity of the location of the tap 614 on the touch-sensitive display 312. A tap 614 is illustrated in the figures by a circle at its location of contact on the touch-sensitive display 312. In FIG. 7B, a first tap 614 is performed by user 110 and detected by client device 104. Since the second input (i.e., 40 successive taps) has not yet been completed, the first tap 614 does not select the OK button 612 despite being performed at the location of the OK button 612 on the touch-sensitive display 312. In FIG. 7C, five taps have been performed resulting in the touch-sensitive display 312 displaying an image of broken glass at five locations on the touch-sensitive display 312. Once the required number of taps has been received, the touch-sensitive display 312 displays the glass sufficiently shattered such that the OK button 612 is accessible and selectable by a subsequent tap 614 performed by user 110 (see FIG. 7D).

In certain example embodiment, the second input required for accessing the funds includes a gesture on the touch-sensitive display 312 of client device 104 meeting a minimum magnitude of force. In this example, the complexity in the input being determined includes the magnitude of force used to perform the gesture. If the financial health data 162 indicates ACCEPTABLE financial health, the second input can be determined to be a gesture on the touch-sensitive display 312 applied with at least a minimum magnitude of force meeting a default force threshold. If the financial health data 162 indicates WEAK financial health, the minimum magnitude of force required can be increased above the default force threshold. The amount of increase in minimum magnitude of force of the second input may be added in a linear or non-linear manner relatively to the degree of weakness in financial health. If the financial health data 162 indicates STRONG financial health, the minimum magnitude of force required can be decreased below the default force threshold.

In certain example embodiment, the second input required for accessing the funds includes a gesture on the touch-sensitive display 312 of client device 104 meeting a minimum duration. In this example, the complexity of the second input includes the duration of the gesture. If the financial health data 162 indicates ACCEPTABLE financial health, the second input can be determined to be a gesture on the touch-sensitive display 312 applied with at least a minimum duration meeting a default duration threshold. If the financial health data 162 indicates WEAK financial health, the minimum duration required can be increased above the default duration threshold. The amount of increase in minimum duration of the second input may be added in a linear or non-linear manner relatively to the degree of weakness in financial health. If the financial health data 162 indicates STRONG financial health, the minimum duration can be decreased below the default duration threshold.

FIG. 8 illustrates an example graphical user interface 700 of a digital wallet application (or other application related to making a payment), displayed on the touch-sensitive display 312 of client device 104. The touch-sensitive display 312 displays a confirmation screen 710 to use a debit card to pay for a purchase. In the example of FIG. 8, the second input is a tap-and-hold gesture 712 (i.e., touch the touch-sensitive display 312 and hold the touch for a certain period of time). The complexity of the second input can be adjusted by requiring the tap-and-hold gesture 712 to be applied on the touch-sensitive display 312 for different minimum durations of time, based on different levels of financial health. For example, the required minimum hold times may be 1 second, 5 seconds and 30 seconds when the financial health data indicates STRONG, ACCEPTABLE and WEAK financial health, respectively. In certain example embodiments, input determination module 406 may display a window or other visual indicator (such as pop-up window 720) to explicitly request and describe the second input required for accessing the funds. The pop-up window 720 can automatically disappear upon receiving the second input.

FIG. 9 illustrates another example graphical user interface 800 of a digital wallet application (or other application related to making a payment), displayed on the touch-sensitive display 312 of client device 104. The touch-sensitive display 312 displays a confirmation screen 810 to use a debit card to pay for a purchase. In the example of FIG. 9, the second input is a circular gesture 812 (i.e., a continuous gesture on the touch-sensitive display 312 that follows a circular path within the dotted lines 814*a* and 814*b*). A gesture that follows a path is illustrated in the figures by a circle at its point of origin and an arrow extending from the circle to illustrate the path of the gesture on the touch-sensitive display 312. The complexity of the second input can be adjusted by requiring the circular gesture 812 to complete the circular path a different number of times, based on different levels of financial health. In this way, the duration of the second input is adjusted by the length of the gesture to be performed and time required to perform the gesture. For example, the required number of times may be 1, 2 and 10 when the financial health data indicates STRONG, ACCEPTABLE and WEAK financial health, respectively. In the example of FIG. 9, the circular gesture 812 has only completed the circular path once. A pop-window 820 is displayed to request and describe the second input required for accessing the funds.

In certain example embodiment, the input to be required for accessing the funds includes a gesture on the touch-sensitive display 312 of client device 104 having a specific pattern. In this example, the complexity in the input being determined includes the complexity of the pattern of the gesture. If the financial health data 162 indicates ACCEPTABLE financial health, the second input can be determined to be a gesture on the touch-sensitive display 312 having a default pattern. If the financial health data 162 indicates WEAK financial health, the second input can be determined to include a more complex pattern than the default pattern (e.g., more changes in direction, longer pattern, multi-touch gesture having an increased number of simultaneous touches, etc.). If the financial health data 162 indicates STRONG financial health, the complexity of the pattern of the second input can be simplified from the default pattern (e.g., less changes in direction, shorter pattern, multi-touch gesture having a decreased number of simultaneous touches or reduction to a single-touch gesture, etc.).

Figure 10C:
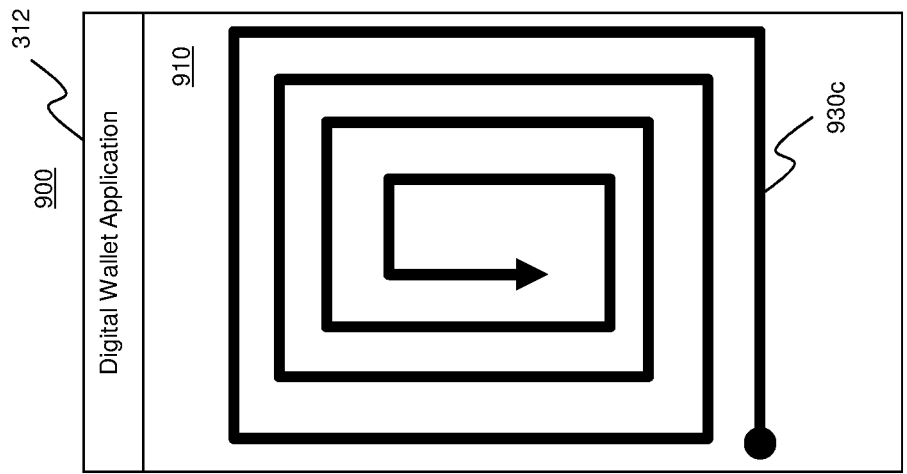
FIGS. 10A-10C are diagrams of another example graphical user interface of a digital wallet application.
Figure 10B:
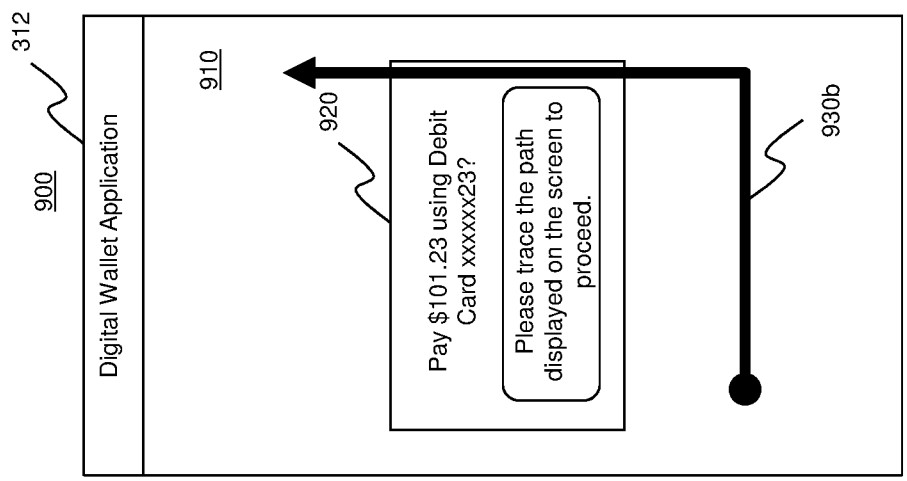
Figure 10A:
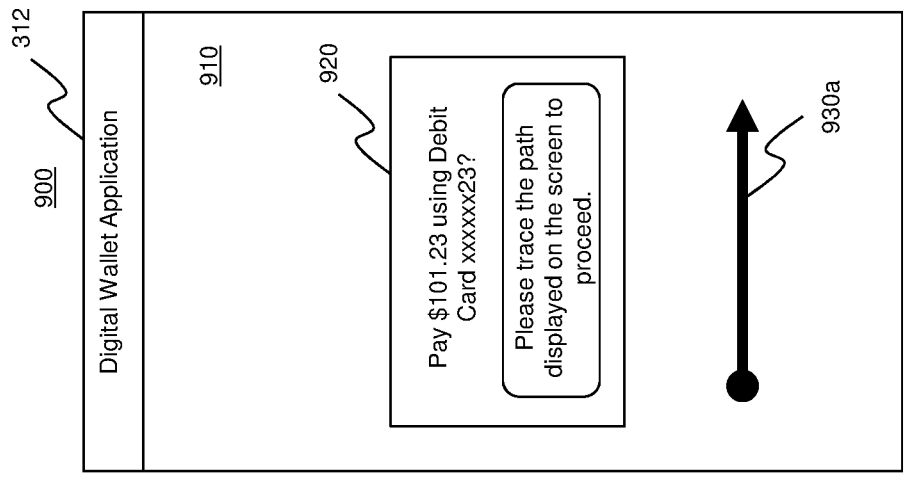

FIGS. 10A-10C illustrates example graphical user interfaces 900 of a digital wallet application (or other application related to making a payment), displayed on the touch-sensitive display 312 of client device 104. The touch-sensitive display 312 displays a confirmation screen 910 to use a debit card to pay for a purchase. In these examples, the second input is a gesture following a certain pattern 930*a*, 930*b* or 930*c*. The complexity of the second input can be adjusted by changing the pattern of the gesture, based on different levels of financial health. For example, the patterns 930*a*, 930*b* and 930*c* are required when the financial health data indicates STRONG, ACCEPTABLE and WEAK financial health, respectively. In the example of FIG. 10C, a pop-up window (not shown) requesting and describing the second input (i.e., a gesture following the pattern 930*c*) is displayed prior to displaying the pattern 930*c*.

It will be appreciated that the complexity of the second input determined for accessing the funds can include variations in any one or more properties of a gesture, such as the number of taps, magnitude of force, duration or pattern traced out by the gesture, or any combination thereof. In certain embodiments, the second input can be a sequence of taps, swipes and gestures of specific patterns and paths. In certain example embodiments, the second input can be the same when financial health data 162 indicates STRONG or ACCEPTABLE levels of financial health, and the complexity of the second input only increases as the financial health data 162 indicates WEAK financial health.

It will also be appreciated that the second input may take on the form of any type of input supported by input devices 310 available to computer system 300 (e.g., client device 104) being used to make the request to access funds. Although the example embodiments describe gestures performed on touch-sensitive display 312, the second input required to access the funds may be in the form of other inputs, such as text, selections of items on a display, voice commands, physically movements of client device 104, or a combination thereof, provided that suitable input devices are available (e.g., keyboards, trackpads, microphones, and sensors to detect physical movements).

In certain example embodiments, input determination module 406 can use context data associated with the transaction for which the funds are being requested in determining the complexity of the second input. Context data may include a description or title of the products/services being purchased, name and location of the merchant, and other information obtained from the software application (e.g., digital wallet application) running the fund access module 400. Context data may also be obtained from other applications running on client device 104, such as a GPS device to determine the location of the transaction.

For example, user 110 may configure the fund access module 400, via the configuration module 400, to increase the complexity of the second input for all purchases related to candy, soft drinks and other types of snacks typically purchased on impulse while waiting in line to pay at retail locations. The input determination module 406 can receive context data indicating that the current transaction and request to access funds relates to the purchase of candy and thus increase the complexity of the second input (even if the financial health data 162 indicates ACCEPTABLE or STRONG financial health of user 110).

In another example, fund access module 400 may be running on client device 104 (e.g., part of a digital wallet or other mobile application) to make a payment of $500 for medical services and related medicine. Input determination module 406 may use the context data (e.g., location, description of products and services, etc.) to determine that the nature of the purchase is necessary and/or unlikely to be an impulse purchase, and thus reduce the complexity of the second input required for accessing the funds. For example, the input determination module 406 may apply a negative multiplier or weight to the increase in complexity that would otherwise be determined based on the financial health data 162 (e.g., the number of taps required for the second input is increased by 0.5 times what would otherwise be added for other transactions). The context data may be used to assign a priority level to the transaction, where different priority levels are associated with different levels of adjustment in the complexity of the second input.

Context data may also include information on previous transactions for similar or related purchases. For example, user 110 may be using a digital wallet application running on client device 104 to purchase shoes. The digital wallet application, via context module 430, may analyze the transaction data 204 stored on data server (using a corresponding API) to determine that the same or similar types of shoes (e.g., based on size, style, and/or brand, etc.) have been purchased within the last month to suggest that the current purchase may not be necessary. As a result, the input determination module 406 may increase the complexity of the second input required to access the funds to purchase the shoes (even if financial health data 162 indicates ACCEPTABLE or STRONG financial health of user 110).

Referring back to FIG. 6, at block 556, the access facilitator module 408 facilitates access to the funds when the second input is received. In the example embodiments of FIGS. 7A-7D, the second input comprises a gesture (i.e., sequence of taps 614) on touch-sensitive display 312. The gesture can be detected by the capacitive touch-sensitive overlay 316 and processed by controller 314, of the touch-sensitive display 312. The gesture can be sent to processor 302 for determining whether the gesture satisfies the properties defining the complexity of the second input (which in the case of FIGS. 7A-7D includes 40 successive taps). The second input is received when the processor determines that the properties of the gesture satisfy the complexity requirements of the second input.

In another example, the second input may incorporate movement of client device 104 (e.g., shake client device 104 for a certain amount of time and/or with a certain degree of force, rotate client device 104, change orientation of client device 104 between landscape and portrait, etc.). The movement of the client device 104 may be detected by a sensor on client device 104, such as accelerometer 322. The accelerometer 322 can then send a signal in response to detecting the movement of the client device 104 to processor 302 for determining whether the movement satisfies the properties defining the complexity of the second input (e.g., the requested movement of the second input). The second input is received when the processor determines that the properties of the movement satisfy the complexity requirements of the second input.

In the example embodiment of FIG. 7D, the access facilitator module 408 facilitates access to the requested funds by enabling the OK button 614 to be selectable by user 110 to complete the purchase when 40 taps have been performed on the touch-sensitive display 312. Once the OK button 614 is selected, the purchase transaction is completed and payment can be sent to the merchant. In another example embodiment, the requested funds may automatically be provided to the intended recipient (e.g., merchant) after the second input is completed.

Figure 11:
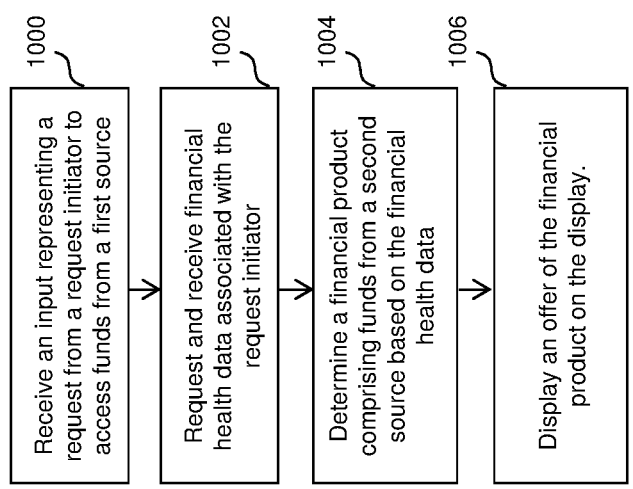
FIG. 11 is a flow diagram of another example of computer executable instructions for facilitating access to funds by offering a financial product.

Referring to FIG. 11, an example embodiment of computer executable instructions for facilitating access to funds by offering to a financial product for use as a second source of funds in the transaction. At block 1000, the request detector module 402 receives an input from an input device 310 representing a request from a request initiator (e.g. user 110 or other purchasing entity) to access funds from a first source for use in a transaction. For example, the input can be the first input received at block 550 or the more complex second input received at block 556 of FIG. 6.

At block 1002, financial health detector module 404 requests and receives, via the communications module 304, financial health data 162 associated with the request initiator, as similarly performed at block 552 of FIG. 6.

At block 1004, product determination module 440 determines a financial product to offer to the request initiator based on the financial health data 162. In certain example embodiments, the financial product can make available a second source of funds to be used in the transaction instead of the first source originally requested.

In an example scenario, a user 110 selects a bank account within a digital wallet application running on client device 104 to pay $1000 for a new computer (e.g., input of block 1000). The client device 104 requests and receives financial health data 162 (e.g., at block 1002) that includes a savings goal of maintain $10,000 in the requested bank account for use as an emergency reserve fund. The financial health data 162 also indicates that financial health of user 110 is WEAK if $1000 from the bank account is used to pay for the purchase of the new computer as the bank account balance would decrease below the emergency reserve amount. Based on this financial health data 162, product determination module 440 may determine that a financial product having a second source of funds is available to user 110 to use as payment for the new computer, such as a loan with 0% interest for 30 days. Use of the financial product will enable the transaction to be completed (i.e., purchase of the computer) without reducing the balance of the savings account, thus maintaining the financial health of user 110 with respect to the emergency reserve fund savings goal.

The financial product can be provided by business entity 190 (or another entity accessible through network 120 by client device 104). In certain example embodiments, product determination module 440 running on the client device 104 can access one or more servers of business entity 190 (e.g., mobile application server 142, web server 146 or data server 160) across network 120 through corresponding APIs to determine the financial products offered by business entity 190. The product determination module 440 can also access the customer data 200, account data 202, and/or transaction data 204 stored in data storage 152 in order to evaluate the eligibility of user 110 in obtaining the financial products, and then select that financial product that user 110 is eligible for and that would result in the desired financial health.

In certain example embodiments, client device 104 sends a request for financial health data 162 to data server 160 (e.g., at block 1002) that includes information regarding the transaction (e.g., amount and source of funds being requested, nature of the products or services being purchased) via the communications module 304 of client device 104 across network 120 to data server 160. Data server 160 can then use the transaction information, along with financial health data 162, to determine a financial product to be offered to user 110. In response to the request for financial health data 162 by client device 104, the data server 160 may send the financial product to the client device 104. Thus, in certain example embodiments, product determination module 440 can be implemented in data server 160 or another server in system 140 of business entity 190.

In certain example embodiments, the financial product may provide a new source of funds (or extension of an existing source) for user 110 to use in the transaction. Examples of the financial products providing a second source of funds that can be identified at block 1004 include a new loan, line of credit or other credit facility, or increase in limit for any existing credit products of user 110. The financial product may be limited to a specific purpose or use in some cases. In an example, user 110 may request to access an amount from a bank account exceeding the account balance. As a result, the financial health data 162 received indicates WEAK financial health associated with the requested use of funds. Product determination module 440 can determine that overdraft protection may be a financial product desirable to user 110 in completing the transaction.

In certain example embodiments, the financial product may be an existing source of funds already available to the user 110. For example, user 110 may have several bank accounts with different balances, used for different purposes and/or associated with different savings goals, and a request is received to access funds from a specific bank account. Product determination module 440 can determine another existing financial product (e.g., bank account, credit card, loan, etc.) of user 110 as an alternate source of funds for the transaction that would maintain or increase overall financial health, or financial health with respect to a specific aspect or source of funds.

In certain example embodiments, product determination module 440 can use context data associated with the transaction for which the funds are being requested in determining the financial product to be offered as the second source of funds. As previously discussed with respect to other example embodiments, context data can include information associated with the transaction, as well as information from previous transactions for similar or related purchases.

For example, fund access module 400 may be running on client device 104 (e.g., part of a digital wallet or other mobile application) to make a payment of $500 for medical services and related medicine from a bank account that has been reserved for emergency funds according to budgeting data forming part of the financial health data 162. Despite having sufficient funds in the requested bank account to make the payment, product determination module 440 may determine that a financial product in the form of medical insurance may be of interest to user 110. Product determination module 440 may also determine that, based on transaction data 204 on previous medical purchases, the premiums and other fees for medical insurance would cost less that the cost of the medical products and services paid by user 110 such that overall financial health would improve. Therefore, product determination module 440 determines a medical insurance product to offer to user 110.

In certain example embodiments, the context data may also be used to assign a priority level to the transaction for which the funds are being requested, where different priority levels are associated with different levels of effort by the product determination module 440 to determine a financial product to provide a second source of funds.

For example, user 110 may configure the fund access module 400, via the configuration module 400, to not offer a second source of funds when the transaction is below a threshold fund amount and/or relates to certain types of daily or reoccurring transactions (e.g., transactions for payment of $10 or less, purchases for lunch). In this example, a request to access funds from a first source (e.g., a chequing account) to pay $10 for a lunch purchase is assigned a low priority level. The product determination module 440 can determine that the assigned priority level of the transaction satisfies a priority threshold level to bypass determination of a financial product to offer as an alternative source of funds for payment, irrespective of whether payment can be made from a second source of funds that would improve the overall financial health of user 110.

In certain example embodiments, context data may include data regarding the manner in which the input is provided (herein referred to as input data). In the example of a gesture input on a touch-sensitive display 312, the gesture can be detected by capacitive touch-sensitive overlay 316 and processed by controller 314 of the touch-sensitive display 312, and then sent to processor 302 (executing request detector module 402) for determining one or more properties of the gesture. Various properties of the gesture can provide useful information regarding the transaction for which the funds are being requested.

For example, the manner in which the gesture is provided may indicate an urgency of the transaction and/or the emotion state of user 110 at the time of the transaction, which can be used to determine a priority level for the requested transaction.

For example, request detector module 402 may determine the period in which a gesture is completed is long or short relative to duration baseline (e.g., set by configuration module 420 or determined by statistical analysis of the length of time for other gestures). An input that is performed quickly may suggest an urgency to the transaction for which the funds are being requested.

In another example, request detector module 402 may determine that the force applied to the touch-sensitive display 312 by the gesture (e.g., determined by force sensor 330) is strong relative to a force baseline (e.g., set by configuration module 420 or determined by statistical analysis of the force of other gestures). An input that is applied with more force on touch-sensitive display 312 may suggest an urgency to the transaction for which the funds are being requested.

In another example, request detector module 402 may determine that the movement of client device 104 during the gesture (as determined by the accelerometer 322) is not steady relative to a movement baseline (e.g., set by configuration module 420 or determined by statistical analysis of the movement detected during other gestures). Movement of the client device 104 during the gesture may suggest an emotional state of user 110, as the movement may be the result of anxiety, distress, urgency, etc., in user 110 with respect to the transaction.

In certain example embodiments, product determination model 440 assigns higher priority levels to a transaction for which the input data is associated with higher levels of urgency or other emotional state of user 110.

In certain example embodiments, the urgency or emotional state of user 110 with respect to the transaction for which funds are being requested may be determined from other context data accessible by client device 104. For example, request detector module 402 may determine that user 110 is located at a particular retail store (e.g., via a GPS device on client device 104) and that user 110 has made many purchases at such retailer based on transaction data 204. The request detector module 402 may also determine from additional context data (e.g., social media activity of user 110, internet browsing activity of user 110 on the retailer's website, etc.) that a sale promotion is currently being held by the retailer. Therefore, request detector module 402 may assign a higher priority level to the transaction as the context data suggests that user 110 has a strong preference or urgency to complete the transaction (e.g., purchase during the sale) despite any negative impact of the transaction on the financial health of user 110 or any of the accounts or savings goals of user 110. The financial product to be offered to user 110 may enable the transaction to be completed while avoiding or mitigating some of the negative impact on the financial health of user 110 (e.g., by providing a new source of funds such as a short-term loan). It will be appreciated that the transactions and circumstances that are determined to be urgent (or associated with other emotional states of user 110) can be user-specific and depend on the context data available. In certain example embodiments, the fund access module 400 may be configured, via the configuration module 400, to offer a second source of funds when a certain level of urgency or other emotional state of user 110 is detected.

In certain example embodiments, product determination model 440 can adjust the effort level in finding a second source of funds based on the priority level of the transaction. For example, effort level may be associated with the range of financial products that can be offered to user 110. Product determination model 440 may be limited to considering existing financial products of user 110 (e.g., existing bank accounts, credit cards, etc.) when the transaction is associated with a low priority, existing financial products of user 110 and new financial products offered by business entity 190 when the transaction is associated with a moderate priority, and existing financial products of user 110 and new financial products offered by any entity accessible by product determination module 440 when the transaction is associated with a high priority.

In certain example embodiments, effort level may be associated with the quality of financial products that can be offered to user 110 to maintain or improve the financial health of user 110. For example, product determination model 440 may provide similar types of financial products but with different credit limits or increases, interest rates, and other terms and conditions based on the priority level of the transaction.

At block 1006, the product determination module 440 may cause the client device 104 to display an offer of the financial product to the request initiator. The user 110 or other purchasing entity operating the client device 104 may accept the offer and use the financial product as the source of funds for the transaction or decline the offer and use the original source of funds requested, by making the appropriate selection inputs. FIGS. 12A and 12B illustrate an example graphical user interface 1100 of a digital wallet application (or other application related to making a payment), displayed on the touch-sensitive display 312 of client device 104. In FIG. 12A, a payment screen 1110 is displayed. User 110 selects the OK button 1112 with gesture 1114, which can serve as the input to request use of $1000 from the bank account associated with the debit card (e.g., received at block 1000). Upon determining at block 1004 that a loan may be a suitable financial product of interest to user 110 and/or that maintains or increases an aspect of the financial health of user 110, an offer screen 1120 is displayed on the touch-sensitive display 312 of the client device 104 for acceptance by user 110. If user 110 selects the accept button, the client device 104 can proceed to the next steps for user 110 to obtain the loan.

While certain aspects of the disclosed example embodiments are described in connection with a purchase of products or services, it will be appreciated that the example embodiments and principles described herein are also suitable for other types of transactions, requiring access to funds, such as a lease, financing or rental of products or service.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the spirit of the invention or inventions. For instance, the steps may be performed in a differing order, or steps may be added, deleted, or modified.

Although the above has been described with reference to certain specific examples, various modifications thereof will be apparent to those skilled in the art as outlined in the appended claims.

The invention claimed is:

1. A computing device for facilitating access to electronic data, the computing device comprising a processor coupled to a memory, a communications module and an input device, the memory storing computer executable instructions that when executed by the processor cause the processor to:
  receive a first input from the input device representing a request from a request initiator to access funds for use in a transaction;
  request and receive, via the communications module, financial health data associated with the request initiator;
  determine a second input for accessing the funds, the second input to be received from the input device and having a complexity of completion via the input device that is dependent on the financial health data;
  enable the input device to receive the second input according to the determined complexity; and
  facilitate access to the funds when the second input is completed.

2. The computing device of claim 1, wherein the financial health data comprises budgeting data, and the complexity of the second input is dependent on whether use of the funds meets the budgeting data.

3. The computing device of claim 1, wherein the computer executable instructions further cause the processor to obtain context data of the transaction, and the complexity of the second input is further dependent on the context data.

4. The computing device of claim 1, wherein the input device comprises a touch-sensitive display, the second input comprises a gesture on the touch-sensitive display, and the complexity of the second input comprises at least one of: a frequency of taps, a degree of force of the gesture, a duration of the gesture, and a pattern of the gesture.

5. The computing device of claim 4, wherein receiving the second input comprises:

receiving the gesture from a capacitive touch-sensitive overlay of the touch-sensitive display;

evaluating a property of the gesture used in defining the complexity of the second input; and determining the property of the gesture satisfies the complexity of the second input.

6. The computing device of claim 1, wherein the second input comprises a movement of the computing device.

7. The computing device of claim 6 further comprising an accelerometer, and wherein receiving the second input comprises:

receiving a signal generated by the accelerometer in response to detecting the movement of the computing device; and determining from the signal that the movement satisfies the complexity of the second input.

8. The computing device of claim 1, wherein requesting and receiving the financial health data comprises:

sending a request for the financial health data to a server, the request comprising information on the transaction; and receiving a response from the server comprising the financial health data, the financial health data incorporating a result of using the requested funds in the transaction.

9. A method of facilitating access to electronic data, the method being executed by a processor of a computing device, the computing device comprising the processor coupled to a memory, a communications module, and an input device, the method comprising:

receiving a first input from the input device representing a request from a request initiator to access funds for use in a transaction;

requesting and receiving, via the communications module, financial health data associated with the request initiator;

determining a second input for accessing the funds, the second input to be received from the input device and having a complexity of completion via the input device that is dependent on the financial health data;

enabling the input device to receive the second input according to the determined complexity; and facilitating access to the funds when the second input is completed.

10. The method of claim 9, wherein the financial health data comprises budgeting data, and the complexity of the second input is dependent on whether use of the funds meets the budgeting data.

11. The method of claim 9 further comprising obtaining context data of the transaction, and wherein the complexity of the second input is further dependent on the context data.

12. The method of claim 9, wherein the input device comprises a touch-sensitive display, the second input comprises a gesture on the touch-sensitive display, and the complexity of the second input comprises at least one of: a frequency of taps, a degree of force of the gesture, a duration of the gesture, and a pattern of the gesture.

13. The method of claim 12, wherein receiving the second input comprises:

receiving the gesture from a capacitive touch-sensitive overlay of the touch-sensitive display;

evaluating a property of the gesture used in defining the complexity of the second input; and determining the property of the gesture satisfies the complexity of the second input.

14. The method of claim 9, wherein the second input comprises a movement of the computing device.

15. The method of claim 14, wherein the computing device further comprises an accelerometer, and receiving the second input comprises:

receiving a signal generated by the accelerometer in response to detecting the movement of the computing device; and determining from the signal that the movement satisfies the complexity of the second input.

16. The method of claim 9, wherein requesting and receiving the financial health data comprises:

sending a request for the financial health data to a server, the request comprising information on the transaction; and receiving a response from the server comprising the financial health data, the financial health data incorporating a result of using the requested funds in the transaction.

17. A non-transitory computer readable medium for facilitating access to electronic data, the computer readable medium comprising computer executable instructions for:

receiving a first input from an input device representing a request from a request initiator to access funds for use in a transaction;

requesting and receiving financial health data associated with the request initiator;

determining a second input for accessing the funds, the second input to be received from the input device and having a complexity of completion via the input device that is dependent on the financial health data;

enabling the input device to receive the second input according to the determined complexity; and facilitating access to the funds when the second input is completed.

18. The non-transitory computer readable medium of claim 17, wherein the financial health data comprises budgeting data, and the complexity of the second input is dependent on whether use of the funds meets the budgeting data.

19. The non-transitory computer readable medium of claim 17 further comprising computer executable instructions for obtaining context data of the transaction, and wherein the complexity of the second input is further dependent on the context data.

20. The non-transitory computer readable medium of claim 17, wherein the input device comprises a touch-sensitive display, the second input comprises a gesture on the touch-sensitive display, and the complexity of the second input comprises at least one of: a frequency of taps, a degree of force of the gesture, a duration of the gesture, and a pattern of the gesture.

* * * * *